(12) United States Patent
Kleinberg et al.

(10) Patent No.: US 9,519,072 B2
(45) Date of Patent: Dec. 13, 2016

(54) METHOD AND APPARATUS FOR LOCATING GAS HYDRATE

(75) Inventors: Robert Kleinberg, Ridgefield, CT (US); Jakob B.U. Haldorsen, Norwalk, CT (US)

(73) Assignee: SCHLUMBERGER TECHNOLOGY CORPORATION, Ridgefield, CT (US)

(*) Notice: Subject to any disclaimer, the term of this patent is extended or adjusted under 35 U.S.C. 154(b) by 1371 days.

(21) Appl. No.: 11/432,269

(22) Filed: May 11, 2006

(65) Prior Publication Data

US 2007/0265782 A1    Nov. 15, 2007

(51) Int. Cl.
| | | |
|---|---|---|
| G01V 1/00 | (2006.01) | |
| G01V 1/28 | (2006.01) | |
| G01V 3/08 | (2006.01) | |
| G01V 3/12 | (2006.01) | |

(52) U.S. Cl.
CPC ............ *G01V 1/288* (2013.01); *G01V 3/083* (2013.01); *G01V 3/12* (2013.01); *G01V 2210/647* (2013.01); *G01V 2210/65* (2013.01)

(58) Field of Classification Search
USPC ................................. 324/323, 334, 337, 338
See application file for complete search history.

(56) References Cited

U.S. PATENT DOCUMENTS

| | | | |
|---|---|---|---|
| 6,717,411 B2* | 4/2004 | Ellingsrud et al. | ........... 324/337 |
| 6,807,489 B2 | 10/2004 | Naville et al. | |
| 7,145,341 B2* | 12/2006 | Ellingsrud et al. | ........... 324/334 |
| 2006/0256651 A1 | 11/2006 | Sanders et al. | |

FOREIGN PATENT DOCUMENTS

| | | |
|---|---|---|
| CN | 1614409 | 5/2005 |
| JP | 2003084069 | 3/2003 |
| JP | 2004028824 | 1/2004 |
| WO | 2006031872 | 3/2006 |

OTHER PUBLICATIONS

Yu, et al. "Transient electromagnetic responses in seafloor with triaxial anisotropy." Geophys. J. Int. (1997) 129.*

(Continued)

*Primary Examiner* — Krystine Breier
(74) *Attorney, Agent, or Firm* — Jakub Michna

(57) ABSTRACT

An exploration paradigm for detecting and/or characterizing gas hydrate deposits using either electromagnetic or seismic surveys, that accounts for the possibility that gas hydrate may accumulate in vertical or subvertical dikes. Geologic factors, such as the presence of the gas hydrate stability zone, indications that a prolific source of gas exists (or existed) below the gas hydrate stability zone and indications that a high flux of gas could be transported into the gas hydrate stability zone, may be considered as part of an exploration strategy. Data may be collected using seismic techniques, such as a walk-away vertical seismic profile techniques, or electromagnetic surveys that are adapted to detecting the presence of vertical or subvertical dikes. In one example, data processing and acquisition techniques may be adapted to detect hydrate dikes, and do not assume a horizontally isotropic earth model.

12 Claims, 9 Drawing Sheets

(56) References Cited

OTHER PUBLICATIONS

Murray, et al. "Formation Evaluation of Gas Hydrate Reservoirs." SPWLA 46$^{th}$ Annual Logging Symposium, Jun. 26-29. 2005.*
Latychev, et al. "On the compliance method and the assesment of three-dimensional gas hydrate deposits." Geophys. J. Int. (2003).*
Tech Chain in Exploration Geophysics Department of Physics, Univeristy of Toroto. Annual Activity Report, 2002/2003.*
Edwards, "On the resource evaluation of marine gas hydrate deposits using sea-floor transient electric dipole-diploe methods", (Geophysics, vol. 62. No. 1 (Jan.-Feb. 1997)).*
Yu, "Transient electromagnetic responses in seafloor with triaxial anisotropy" (Geophysics J. Int. (1997)).*
Collett, "ChevronTexaco GOM Gas Hydrate JIP Drilling Program Downhole Logging Program—Cruise Report—" May 21, 2005.*
Collett, "ChevronTexaco GOM Gas Hydrate JIP Drilling Program Downhole Logging Program—Cruise Report—", May 21, 2005.*
Edwards (Geophysics, vol. 62, No. 1 (Jan.-Feb. 1997)).*
Collett "ChevronTexaco GOM Gas Hydrate JIP Drilling Program Downhole Logging Program—Cruise Report—" May 21, 2005.*
Yu (Geophys. J. Int. (1997)).*
Belosludov, "Absolute Stability Boundaries of Clathrate Hydrates of Cubic Structure II", Journal of Supramolecular Chemistry 2 (2002).*
Edwards (Geophysics, vol. 62, No. 1 (Jan.-Feb. 1997).*
Edwards, (Geophysics, vol. 62, No. 1 (Jan.-Feb. 1997)).*
Andreassen, K., et al., Multicomponent ocean bottom cable data in gas hydrate investigation offshore of Norway, Journal of Geophysical Research, 2003, pp. 9-1 thru 9-11, vol. 108, No. B8.
Brewer, P. G., et al., Deep-ocean field test of methane hydrate formation from a remotely operated vehicle, Geology, May 1997, pp. 407-410, vol. 25, No. 5.
Chave, A. D., et al., Electrical Exploration Methods for the Seafloor, in Nabighian, M. N., et al., editors, Electromagnetic Methods in Applied Geophysics—Applications Parts A and B, 1991, pp. 931-966, Society of Exploration Geophysicists.
Cheesman, S. J., et al., On the theory of sea-floor conductivity mapping using transient electromagnetic systems, Geophysics, Feb. 1987, pp. 204-217, vol. 52, No. 2.
Edwards, R. N., On the resource evaluation of marine gas hydrate deposits using sea-floor transient electric dipole-dipole methods, Geophysics, Jan.-Feb. 1997, pp. 63-74, vol. 62, No. 1.
ElDesmo, T., et al., Sea Bed Logging (SBL), a new method for remote and direct identification of hydrocarbon filled layers in deepwater areas, First Break, Mar. 2002, pp. 144-152, vol. 20.3.
Ellingsrud, S., et al., Remote sensing of hydrocarbon layers by seabed logging (SBL): Results from a cruise offshore Angola, The Leading Edge, Oct. 2002, pp. 972-982 (even pages only).
Holbrook, W. S., et al., Seismic detection of marine methane hydrate, The Leading Edge, Jul. 2002, pp. 686-689.
Hornbach, M. J., et al., Three-dimensional structure of fluid conduits sustaining an active deep marine cold seep, Geophysical Research Letters, Mar. 2007, pp. 1-5. vol. 34.
Koefoed, O., Geosounding Principles 1: Resistivity Sounding Measurements, 1979, pp. 3-4, Elsevier Scientific Publishing Company, Amsterdam.
Kumar, D., et al., Seismic anisotropy at Hydrate Ridge, Geophysical Research Letters, 2006, pp. 1-4, vol. 33, L01306.
Telford, W. M., et al., Applied Geophysics, 1976, pp. 249-255, Cambridge University Press, Cambridge, Great Britain.
Tooley, R. D., et al., Reflection and Transmission of Plane Compressional Waves, Geophysics, Aug. 1965, vol. XXX, No. 4, pp. 552-570.
Weitemeyer, K., et al., The Use of Marine EM Methods for Mapping Gas Hydrates, Offshore Technology Conference, Houston, TX, May 2005, pp. 1-5, OTC 17170.
Willoughby, E. C., et al., Assessment of Marine Gas Hydrate Deposits: A Comparative Study of Seismic, Electromagnetic and Seafloor Compliance Methods, Proceedings of the Fifth International Conference on Gas Hydrates, 2005, pp. 802-811, vol. 3, Paper 3014.
Wood, W. T., et al., Decreased stability of methane hydrates in marine sediments owing to phase-boundary roughness, Nature, Dec. 2002, pp. 656-660, vol. 420, No. 6916.
Yuan, J., et al., The assessment of marine gas hydrates through electrical remote sounding: Hydrate without a BSR?, Geophysical Research Letters, Aug. 2000, pp. 2397-2400, vol. 27, No. 16.
First Office Action of Chinese Application No. 201210253337.4 dated Jun. 5, 2014: pp. 1-8.
Jianming, "Physical geography identification method for gas hydrate," Marine Geology Letters, 1999, 9th Edition: pp. 3-5.

* cited by examiner

METHOD AND APPARATUS FOR LOCATING GAS HYDRATE

BACKGROUND

1. Field of Invention

The present invention relates to systems and methods for locating gas hydrate deposits.

2. Discussion of Related Art

Gas hydrates are a class of clathrate (lattice-like) compounds in which individual small molecules, commonly in the gas phase at room temperature and pressure, occupy sites within a solid crystalline matrix of water molecules. In natural gas hydrate reservoirs, the guest molecules are either pure methane or a mixture of compounds comprising natural gas. For gas hydrate deposits to form, a source of gas is required. Seeps of natural gas, generally comprising methane, are common in many parts of the world. Natural gas hydrate deposits are found in both terrestrial and marine environments. Terrestrial hydrates accumulate in and under permafrost in arctic regions. Marine gas hydrates may be found trapped in subseafloor sediments in water depths of at least about 500 meters (m).

Gas hydrates form at elevated pressure and reduced temperature. The gas hydrate stability zone in subsea sediments can be delineated on a temperature versus depth (pressure) profile with respect to the hydrothermal gradient (for subsea gas hydrates), geothermal gradient and clathrate phase boundary, as shown in FIG. 1. Referring to FIG. 1, there is illustrated a phase diagram showing the pressure-temperature dependence of methane-hydrate stability in a subsea environment. On the vertical axis, pressure is represented in terms of depth (in meters) below the sea surface (this conversion assumes the normal ocean and pore pressure gradient of 10 MPa/km). On the horizontal axis is temperature in degrees Celsius. The seafloor is indicated as dotted line 100. The geothermal gradient is shown as line 104 and the hydrothermal gradient is shown as line 106. Hydrate can exist when the temperature at a given pressure is less than the hydrate transition temperature at that pressure. Line 102 illustrates the hydrate-gas phase boundary as a function of temperature and pressure. For temperature and pressure conditions below this line, methane may exist in the hydrate form. For temperature and pressure conditions above this line, methane may exist in the gas phase. The position of the hydrate phase boundary is primarily a function of gas composition, but may also be controlled by pore fluid composition (e.g. presence of salts), pore size, and possibly sediment mineralogy. For example, adding sodium chloride to the water may shift line 102 to the left, while adding carbon dioxide, hydrogen sulfide and other hydrocarbons may shift line 102 to the right.

Hydrates are stable above the isotherm at which the geothermal gradient 104 of the solid earth crosses the phase line 102, typically several hundred meters below the seafloor. This is the base of the gas hydrate stability zone 108. The upper boundary of the gas hydrate stability zone 108 may be by the intersection of the hydrothermal gradient 106 and the hydrate phase boundary 102. Hydrothermal and geothermal gradients are locality dependent, and can differ markedly with geographical location and tectonic setting. Since natural gas hydrates are less dense than water, they are not found in the water region of the gas hydrate stability zone. This is because any hydrate forming in the water floats to the surface and decomposes. However, they are effectively trapped in subseafloor sediments.

Hydrates are also stable in a band of depths below the land surfaces in arctic regions, overlapping and below the range of permafrost stability. FIG. 2 illustrates a gas-hydrate phase diagram defining the gas hydrate stability zone (GHSZ) in a terrestrial arctic environment. Gas hydrate exists when the temperature is less than the gas hydrate transition temperature (i.e., the temperature at which the phase boundary between the gas and hydrate forms is crossed) at the local pressure. The gas-hydrate phase boundary is illustrated as line 110, dotted line 112 illustrates the geothermal gradient, and line 114 illustrates the fresh water-ice phase boundary. On the vertical axis, pressure has been converted to depth below ground level assuming the normal pore pressure gradient of 100 bar/km (10 MPa/km). Terrestrial gas hydrate exploration programs have been successful in several areas, such as Siberia, the Canadian arctic, and the North slope of Alaska.

Over one hundred occurrences of gas hydrates on continental margins and in inland seas have been documented, suggesting that gas hydrates are widespread in deep water marine environments. In most cases, the location and areal extent of hydrate deposits are estimated from a peculiar seismic signature of gas hydrate presence called the bottom simulating reflector (BSR). The BSR is seen in many marine seismic images, running parallel to, and several hundred meters below, the seafloor, and approximately coincides with the base of the gas hydrate stability zone. Surveys of bottom simulating reflectors found in various parts of the world suggest that the amount of organic carbon stored in undersea gas hydrates is very large. A widely quoted estimate predicts that there may be twice as much organic carbon in gas hydrates as there is in all recoverable and unrecoverable conventional fossil fuel sources, including natural gas, coal and oil. In addition, marine gas hydrates are thought to be primarily found on continental slopes, which are usually within the exclusive economic zones of coastal nations and near consumers in the United States, Japan, India and elsewhere.

However, the actual amount of gas hydrate stored in marine sediments is highly uncertain. Although there have been several major drilling campaigns (e.g., in regions offshore of South Carolina and Oregon), and a few significant concentrations have been found in limited depth intervals, gas hydrate is generally dilute throughout the gas hydrate stability zone in most locations that have been drilled.

Another characteristic of the seismic response to gas hydrate is amplitude blanking within the gas hydrate stability zone. "Blanking" refers to a depth interval with low amplitude reflections in a seismic image, as shown, for example, in FIG. 3. Referring to FIG. 3, a region 116 having low amplitude reflections can be seen between the seafloor 100 and the bottom simulating reflector 118. Appearances of region 116 in seismic images is referred to as amplitude blanking. A variety of explanations have been proposed to explain blanking. One explanation that has attained widespread support holds that hydrates, which increase the acoustic velocity of unconsolidated sediments, are most likely to form in high porosity (i.e., low velocity) strata, thus reducing the acoustic contrast with neighboring strata. Blanking has also been explained by the disruption of sedimentary stratigraphy in marine environments thought to harbor hydrate deposits. Another explanation suggests that destructive interference from vertically displaced reflectors within the Fresnel zone reduces the amplitude of the seismic reflections. A fourth explanation attributes blanking to the presence of liquid and gas migrating upwards through conduits which may be connected to deeper faults. Although any of these explanations is plausible, establishing a connection between any of them and an exploration strategy has proved difficult.

A number of theoretical studies have described the principles of seafloor electromagnetic surveys. However, for the most part, the emphasis of such work has been on one-dimensional earth models in which conductivity changes only with depth. Electromagnetic field studies have been carried out offshore of Vancouver and offshore of Oregon, where seismic and drilling programs has previously indicated that gas hydrate was present. However, data processing for all hydrate surveys has assumed horizontally stratified earth, in which the electrical conductivity is isotropic within each horizontal layer.

SUMMARY OF INVENTION

It is becoming increasingly apparent that conventional seismic and electromagnetic hydrate exploration programs, which assume the existence of horizontal, laterally extensive hydrate accumulations, may be missing significant accumulations of gas hydrate on continental slopes. According to embodiments of the invention, there are presented methods and systems that encompass an exploration paradigm that may be based, at least in part, on a particular hydrate deposit accumulation mechanism. Failure of the bottom simulating reflector to be a reliable indicator of abundant hydrate, and the seismic amplitude blanking sometimes observed coincident with the gas hydrate stability zone, are consistent with a model in which hydrate may accumulate in vertical or sub-vertical dikes. Other mechanisms may be less likely to produce abundant hydrate accumulations due to limited in situ organic carbon, reduced permeability to free or dissolved gas once hydrate forms, and the inability of hydrate to concentrate by migration to high porosity reservoir rock, as discussed below. Embodiments of this exploration paradigm may expand exploration strategy beyond exclusive reliance on traditional indicators and may incorporate geological and geomechanical reasoning.

According to one embodiment, the following factors may be considered and may increase the probability of finding gas hydrate in economically significant quantities:

1) Appropriate temperature and pressure conditions. Specifically, gas hydrate may form only within the gas hydrate stability zone, as discussed above.

2) A prolific source of gas. As discussed below, it may be unlikely that a reservoir fed solely by microbial breakdown of in situ organic matter will generate enough methane to produce a substantial hydrate deposit. Therefore, it may be more appropriate to look for hydrate in regions where other sources of gas exist.

3) Faults or fractures through the gas hydrate stability zone, either tectonic in origin or caused by the pore pressure from underlying gas accumulations may be associated with significant hydrate deposits. Continuous or episodic flows of gas may generate a series of parallel hydrate dikes, as discussed below. This geometry may be considered when constructing a system or method for detecting and/or characterizing hydrate deposits.

4) The type of sediment may also affect the probability of finding hydrate. Specifically, coarse-grained porous sediments may be favorable reservoirs for hydrate, as they are for conventional oil and gas deposits.

Embodiments of the invention may take into account these factors and construct systems and methods for finding and quantifying hydrate deposits that may be more accurate and/or reliable than are traditional exploration programs that are primarily based on the bottom simulating reflector.

According to one embodiment, there is provided a method of detecting gas hydrate comprising collecting seismic data about a region using a vertical seismic profile technique, and characterizing at least one hydrate dike formation based at least in part on the seismic data. In one example, characterizing the at least one hydrate dike formation may include estimating at least one of a dip and strike of a hydrate dike. In another example, collecting the seismic data may include deploying at least one seismic receiver in a well within the region, activating a seafloor seismic source at a first location a first distance away from the well to produce a wave incident on the at least one hydrate formation, recording reflected wave energy from the at least one hydrate dike formation with the at least one receiver, moving the seafloor seismic source to a second location a second distance away from the well, and repeating activating the source and recording reflected wave energy. In another example, collecting the seismic data may include deploying at least one seismic receiver in a well within the region, activating a seafloor seismic source at a first location a first distance away from the well to produce a wave incident on the at least one hydrate dike formation, recording reflected wave energy from the at least one hydrate dike formation with the at least one receiver, moving the at least one receiver vertically in the well by an amount sufficient to achieve a predetermined spatial sampling resolution, and repeating activating the source and recording reflected wave energy. The receiver can be moved prior to or after repeating the steps of activating the source and recording reflected wave energy. In addition, the method may collecting geologic information about the region, and determining a likelihood of significant hydrate presence in the region based at least in part on the geologic information. Collecting geologic information may include, for example, any or all of identifying a location of a gas hydrate stability zone, determining a presence of a substantial source of gas below the gas hydrate stability zone, and determining a presence of at least one of a fault or fracture extending into the gas hydrate stability zone from below the gas hydrate stability zone.

According to another embodiment, a method of detecting gas hydrate may comprise collecting data about a region using an electromagnetic surveying technique, and characterizing at least one hydrate dike formation based at least in part on the data. In one example, collecting the data may include performing an electromagnetic survey of the region using a transmitter and receiver system adapted to detect macroscopic subseafloor electrical anisotropy. In another example, performing the electromagnetic survey includes site may include performing the electromagnetic survey of the region using a transmitter and receiver system including a cross dipole-dipole array of antennas. In another example, collecting the data may include, for example, estimating a direction of maximum horizontal stress in the region, towing a transmitter-receiver system over the site in a first direction parallel to the direction of maximum horizontal stress to collect first data, towing the transmitter-receiver system over the site in a second direction perpendicular to the first direction to collect second data, and comparing the first and second data to detect evidence of macroscopic electrical anisotropy in the subsurface. In addition, the method may further comprise collecting geologic information about the region, and determining a likelihood of significant hydrate presence in the region based at least in part on the geologic information. Collecting geologic information may include, for example, any or all of identifying a location of a gas hydrate stability zone, determining a presence of a substantial source of gas below the gas hydrate stability zone, and determining a presence of at least one of a fault or fracture extending into the gas hydrate stability zone from below the gas hydrate stability zone.

On embodiment of an exploration method for detecting marine gas hydrate may comprise selecting an exploration site based on a geologic indication of a probable presence of hydrate dikes, surveying the exploration site using at least one of a seismic survey technique and an electromagnetic survey technique to collect data about the exploration site, and processing the data based on an earth model that accounts for the probable presence of hydrate dikes. Selecting the exploration site may comprise, for example, selecting the exploration site based on the geologic indication of a presence of a gas hydrate stability zone, a source of gas located beneath the gas hydrate stability zone, and at least one channel that can convey a high flux of gas into the gas hydrate stability zone. In one example, surveying the exploration site may include surveying the exploration site using a walk-away vertical seismic profile technique. In another example, surveying the exploration site may include performing an electromagnetic survey of the exploration site using a transmitter and receiver system adapted to detect macroscopic subseafloor electrical anisotropy. Such a transmitter and receiver may include, for example, a cross dipole-dipole array of antennas. Alternatively, a transmitter and receiver system may comprise an array of horizontal electric dipole antennas, including at least two transmitter antennas and at least two receiver antennas; and wherein the antennas are arranged so as to provide at least four transmitter-receiver pairs, including a transverse electric pair and a transverse magnetic pair. In another example, surveying the exploration site may include activating a seismic source proximate a seafloor, the seismic source being adapted to produce Stoneley waves and shear waves; and wherein the step of processing the data includes analyzing the Stoneley waves and shear waves refracted along the seafloor to detect evidence of azimuthal anisotropy.

According to another embodiment, a method of detecting marine gas hydrate deposits may comprise selecting a site to be surveyed based on geologic indications, other than presence of a bottom simulating reflector, of a likely presence of substantial gas hydrate, and performing at least one of an electromagnetic survey and a seismic survey of the site to obtain evidence of subseafloor horizontal conductive anisotropy. In one example, the method may include determining a stress tensor of the site, and performing the electromagnetic survey may comprise based on the stress tensor, estimating a direction of maximum horizontal stress in subsurface at the site, towing a transmitter-receiver system over the site in a first direction parallel to the direction of maximum horizontal stress to collect first data, towing the transmitter-receiver system over the site in a second direction perpendicular to the first direction to collect second data, and comparing the first and second data to detect evidence of macroscopic electrical anisotropy in the subsurface. In another example, performing the seismic survey may comprise surveying the site using a walk-away vertical seismic profile technique. In addition, selecting the site may include selecting the site based on a presence of a subseafloor gas hydrate stability zone, and a presence of at least one of a fault and a fracture extending into the gas hydrate stability zone from below the gas hydrate stability zone.

Another embodiment is directed to a system adapted to detect gas hydrate dikes in a marine environment. The system may comprise a surveying apparatus configured to collect data from an exploration site, and a processor configured to analyze the data from the exploration site in accordance with an earth model that accounts for the presence of the gas hydrate dikes. In one example, the surveying apparatus may comprise an electromagnetic surveying system configured to detect evidence of subseafloor horizontal conductive anisotropy, such as, for example, a cross-dipole array of transmitter and receiver antennas. In another example, the surveying apparatus may comprise a seismic surveying system including a seismic source located proximate the seafloor and at least one seismic receiver, and wherein the data is seismic reflection data. For example, the at least one seismic receiver may be located in a borehole disposed within the exploration site, and the seismic surveying system may be configured to perform a walk-away vertical seismic profile survey. In another example, the earth model may account for the presence of a series of parallel gas hydrate dikes, and wherein the seismic surveying system is configured to operate at a frequency selected to achieve sufficient resolution to detect at least one of a width of individual hydrate dikes in the series of parallel hydrate dikes and a spacing between individual hydrate dikes in the series of parallel hydrate dikes.

BRIEF DESCRIPTION OF THE DRAWINGS

Various embodiments and aspects of the invention are described in detail below with reference to the accompanying figures. It is to be appreciated that the accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
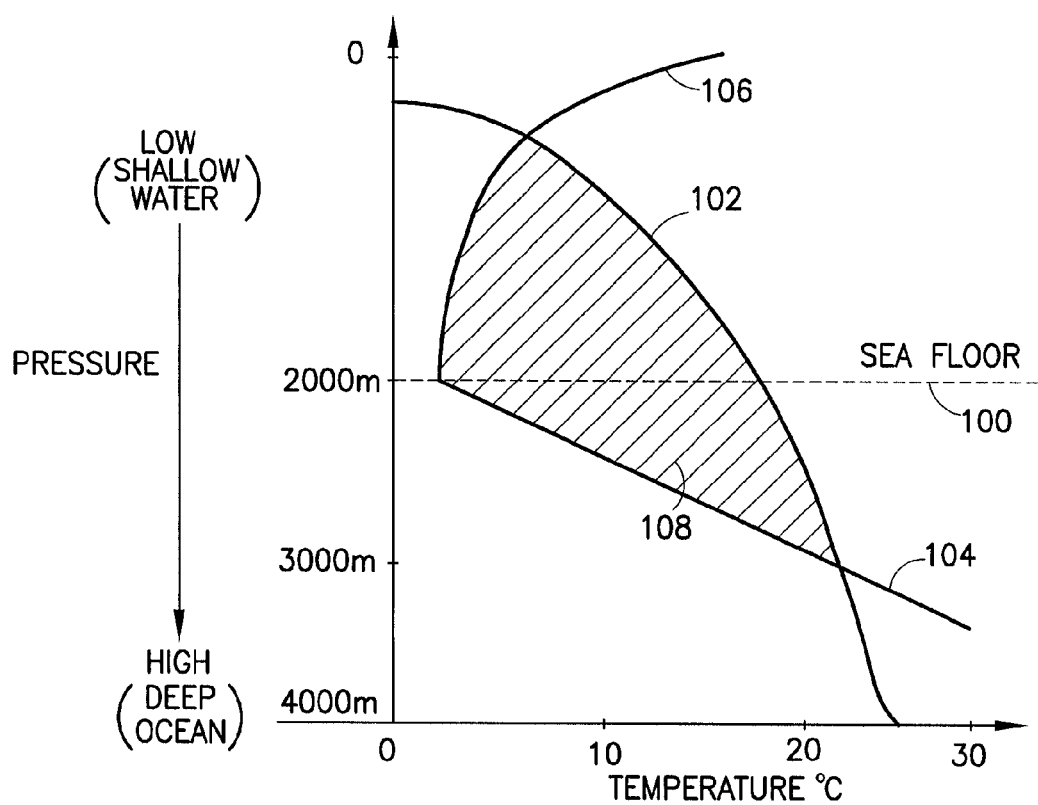
FIG. 1 is a phase diagram showing the pressure-temperature dependence of methane-hydrate stability in a subsea environment.
Figure 2:
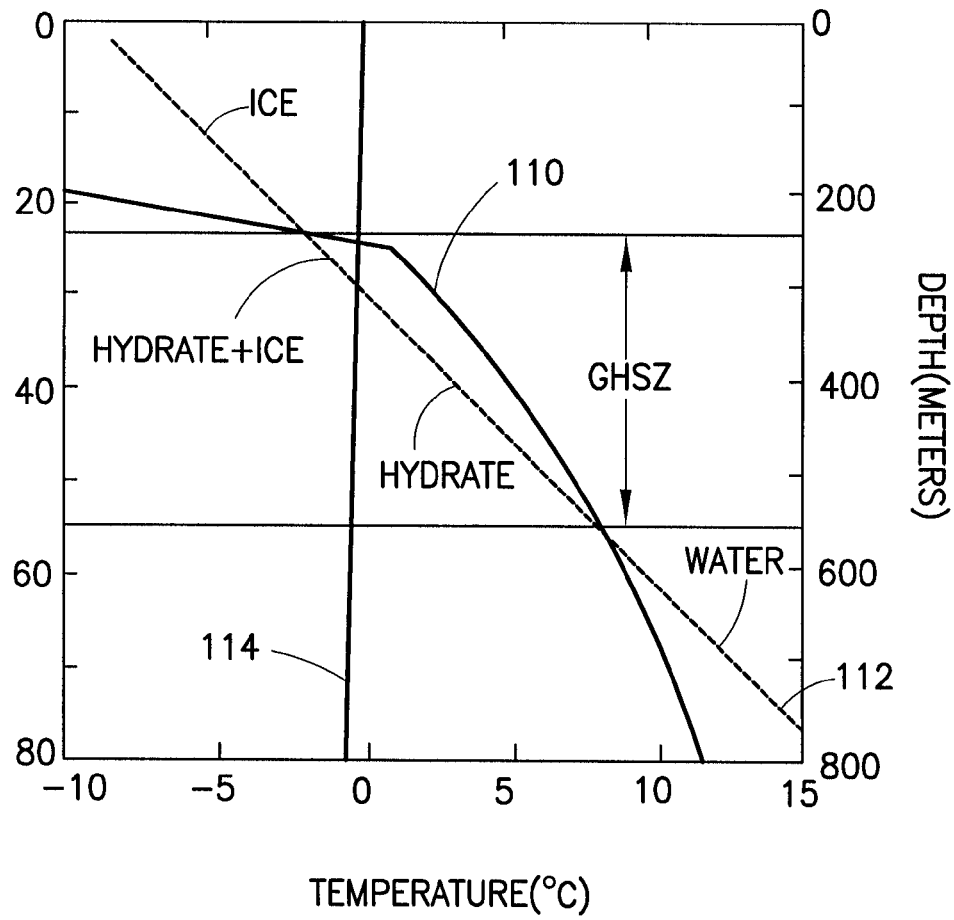
FIG. 2 is a gas-hydrate phase diagram defining the gas hydrate stability zone in a terrestrial arctic environment.
Figure 3:
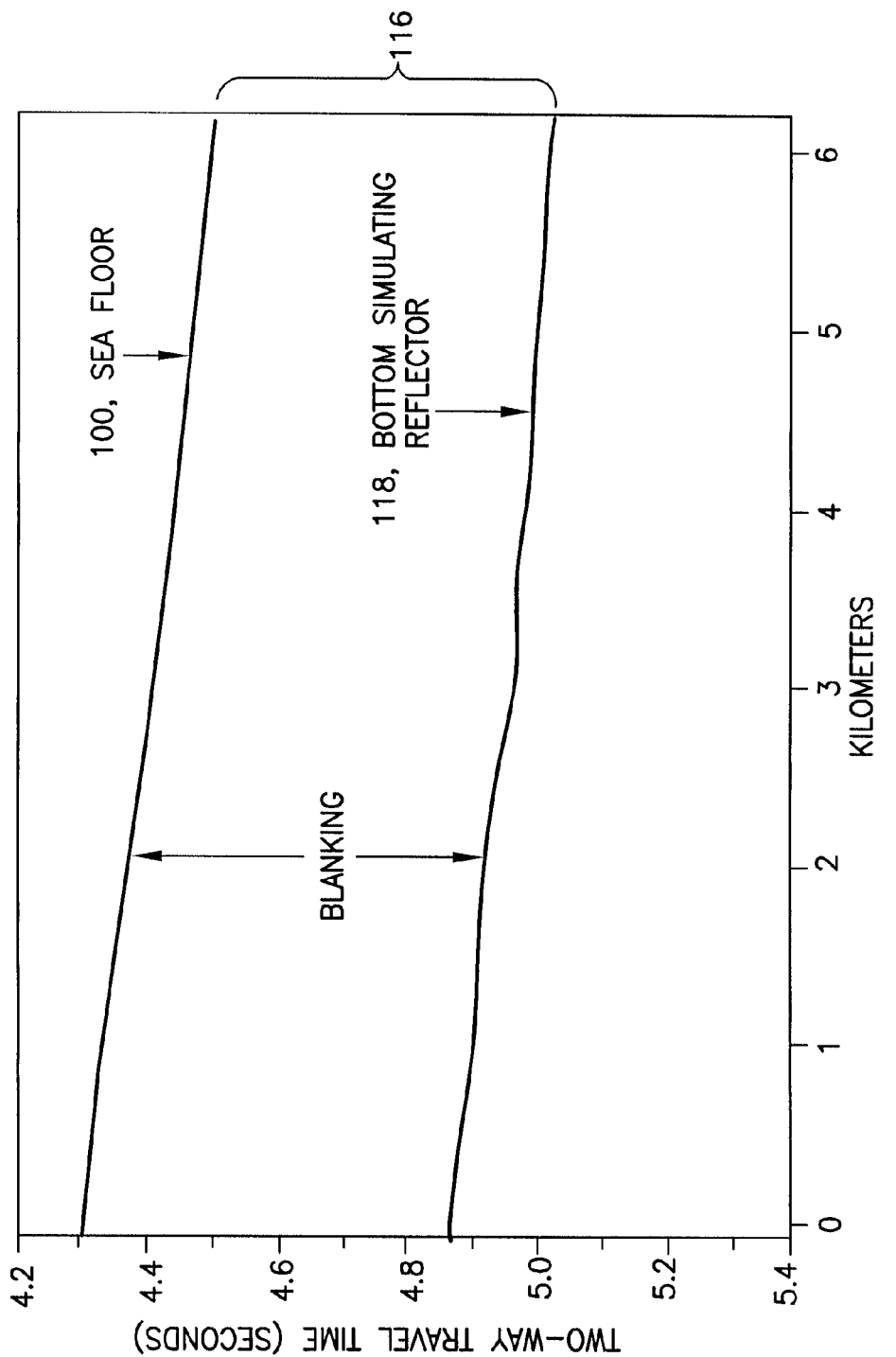
FIG. 3 is a seismic image showing an occurrence of amplitude blanking and a bottom simulating reflector.

Research suggests that the total amount of hydrocarbon gas trapped in gas hydrate in the near subsurface may be immense. If so, this has significant implications for the sourcing of fossil fuel and for global climate change. In addition, gas hydrates have been suggested to be one agent contributing to seafloor instability, and therefore locating and quantifying them may be important. Gas hydrate is expected to be abundant on continental slopes and there is widespread seismic evidence for very large offshore gas hydrate deposits. Therefore, it is surprising that drilling campaigns in promising regions have found very little gas hydrate. The disappointing results of marine gas hydrate exploration programs to date suggest that either gas hydrate on continental slopes is much less abundant than had been expected, or that conventional exploration paradigms are ineffective.

Conventionally, marine gas hydrate exploration prospects have been defined by seismic surveys, with the bottom simulating reflector (BSR) being regarded as theoretically the most reliable indicator of hydrate presence. However, in actuality, the BSR often seems to be a poor predictor of hydrate occurrence. For example, at a drilling site on Blake Ridge offshore of South Carolina, little hydrate was found in a well drilled to a strong BSR, whereas hydrate was found in a well drilled in a locale where the BSR was absent. Furthermore, although the BSR is commonly thought to be caused by an accumulation of free gas trapped under sediment rendered relatively impermeable by accumulation of hydrate at the base of the gas hydrate stability zone, free gas is often not found at the BSR, at least not in quantities detectable by wireline logging tools. When interpreting the significance of the BSR, two principles should be kept in mind. Firstly, very little gas may be required to produce a strong seismic reflector, and secondly, an apparently continuous reflector may not imply a continuous gas-saturated medium. High resolution processing has revealed that a strong BSR that may appear continuous at low resolution can actually be produced by small discontinuous pockets of gas. These factors may contribute to the apparent inaccuracy of the BSR as an indicator of the presence of gas hydrate.

Current exploration programs may miss significant accumulations of gas hydrate on continental slopes. According to aspects and embodiments of the invention, there is provided a hydrate exploration paradigm based on a model of hydrate deposit accumulation that includes electromagnetic and/or seismic techniques for detecting hydrate deposits. According to an embodiment of the model, at least in some reservoirs, gas hydrate may accumulate in arrays of vertical or subvertical dikes. It is to be understood that the term "dike" as used herein is defined as an intrusion that invades preexisting rocks, commonly in a tabular shape that cuts vertically or nearly vertically across preexisting layers. The model suggests that the bottom simulating reflector may be a false positive indicator of abundant hydrate, and that its absence may be a false negative indicator. In addition, the model is consistent with amplitude blanking observed in the gas hydrate stability zone, as discussed below. Such vertical or sub-vertical hydrate dikes may not be reliably detected by conventional seismic acquisition and processing methods generally in use. Therefore, aspects and embodiments of the invention provide exploration techniques that may take into account this model of hydrate formation and may be capable of detecting gas hydrate dikes that are difficult or impossible to locate using conventional techniques of exploration geophysics as presently applied.

According to one embodiment, there are presented a number of seismic techniques adapted to finding arrays of parallel hydrate dikes. According to other embodiments, electromagnetic (EM) techniques may also be used to find and characterize gas hydrate deposits. Gas hydrate is similar to ice, and is therefore an insulator. It may present a string contrast to marine sediments which are normally saturated with salt water and have conductivities typically around 1 S/m. Its strong conductivity contrast and near-seafloor occurrence may make gas hydrate a nearly ideal target for marine EM surveys. Therefore, some embodiments of the invention are directed to EM survey methods and systems adapted to detecting gas hydrate dikes, as discussed below. In particular, such EM methods may include data processing that may be based on an earth model that accounts for the possible presence of hydrate dikes and does not assume a horizontally isotropic earth, as discussed further below.

It is to be appreciated that this invention is not limited in its application to the details of construction and the arrangement of components set forth in the following description or illustrated in the drawings. The invention is capable of other embodiments and of being practiced or of being carried out in various ways, and the invention is not limited to the examples presented unless specifically recited in the claims. In addition, it is to be appreciated that the phraseology and terminology used herein is for the purpose of description and should not be regarded as limiting. The use of the words "including," "comprising," "having," "containing," or "involving," and variations thereof herein, is meant to encompass the items listed thereafter and equivalents thereof as well as additional items.

From an economic standpoint, it may be of primary importance to distinguish gas hydrate deposits that have productive potential from those that do not. Liberating gas from hydrate requires temperature increase, pressure reduction, or inhibitor use, none of which may be practical when hydrate is in low concentration, no matter how large the overall resource. To develop less ambiguous exploration methods, it may be important to understand the mechanisms by which gas hydrate deposits are formed. Given appropriate temperature and pressure conditions, gas availability may be a primary factor controlling the quantity and distribution of hydrate deposits, and the nature of a deposit may depend on how gas is delivered to the site of hydrate production. Gas may be provided to the gas hydrate stability zone in one of three ways, namely by local production of the gas in the gas hydrate stability zone, migration of gas through pore spaces in the sediment into the gas hydrate stability zone, and migration of gas through faults or fractures into the gas hydrate stability zone.

Local production of methane is caused by microbial breakdown of organic matter. Biogenic gas in the gas hydrate stability zone will form hydrate promptly upon generation. Unlike oil and gas, gas hydrate, once formed within its stability zone, will not migrate to reservoirs where it can attain a significant concentration. Therefore, in the absence of external sources of gas, gas hydrate concentrations can be expected to be correlated with the presence of organic source material originally in place, and the ultimate concentration of hydrate in such deposits may be limited by the concentration of total organic carbon. Some surveys of marine sediments in water depths of less than 3000 m have shown that a maximum total organic carbon concentration, conventionally expressed as weight percentage of total sediment, may be about 2%, and an average total organic carbon concentration may be about 0.55%. Only a fraction of this total organic carbon is converted to methane, and thus in deposits where in situ biogenic production of methane is the only source of gas, hydrate concentrations are expected to be very low, for example, not more than a few percent of total sediment volume. Although such biogenic deposits may be spatially extensive, they are unlikely to be economically interesting due to the low concentration of hydrate.

In some areas, sources of gas may lie below the base of the gas hydrate stability zone. The gas may be either dissolved in pore water or free in bubbles, and may originate from one or more sources. For example, gas may originate from microbial activity (biogenic) or from high temperature cracking of deep petroleum (thermogenic). Gas may also result from sedimentation, causing pre-existing gas hydrate to decompose as it exits the gas hydrate stability zone through its base. Such gas may move upward through sedimentary pores into the gas hydrate stability zone, where it forms hydrate. However, unlike oil and gas which remain mobile as they migrate up through a reservoir, gas hydrate is immobile and will not freely migrate once formed. Moreover, the accumulation of hydrate from dissolved gas moving up from below may be self-limiting due to pore clogging and consequent reduction of hydraulic permeability. In addition, sediments that do not necessarily block water flow, may nonetheless block upward migration of free gas due to capillary pressure effects. Thus, if transport through the pore space is the only means by which gas can migrate through the gas hydrate stability zone, exploitable (e.g., large, high concentration) gas hydrate deposits are unlikely to be created.

As discussed above, according to some embodiments of the invention, it is proposed that in at least in some reservoirs, gas hydrate may form primarily as vertical or subvertical dikes whose strike is parallel to the direction of maximum horizontal stress. Multiple dikes may be parallel, or may develop in chevrons, but may not necessarily be equally spaced, depending on; for example, the nature of the sediment in which the hydrate deposits form. According to one embodiment, gas hydrate deposits may be associated with faults or fractures extending into the gas hydrate stability zone from areas below its base, where there may be substantial accumulations of free gas. As gas inside such faults or fractures within the gas hydrate stability zone turns into hydrate, it may slowly fill the channel, forming hydrate dikes, as discussed below.

A fault in the earth is a plane or zone of slippage. Faults are easily recognized on seismic records as lines across which the strata are discontinuous. Continuous faults extending into and though the gas hydrate stability zone may be efficient pathways for distributing gas throughout the gas hydrate stability zone. However, the acceptance of this idea has been delayed by the knowledge that gas phase methane cannot exist in thermodynamic equilibrium with excess water within the gas hydrate stability zone. Nonetheless, the preponderance of marine hydrate accumulations appear to be associated with fault systems through which dissolved or gaseous methane can move upwards rapidly. For example, hydrates are associated with natural gas vents and seeps in the Black Sea, off the Pacific coast of North America, in the Gulf of Mexico, and elsewhere. Even the Blake Ridge deposit, situated on a passive margin, is associated with faults extending from below the bottom simulating reflector to the seafloor. These faults may constitute efficient conduits for transport of methane which may be in the gas phase and therefore out of thermodynamic equilibrium with surrounding sediments.

A tensile fracture is the opening of a fluid pathway in the earth, without necessarily being associated with significant slippage (as is the case with faults). Fractures can occur when the pore pressure exceeds the minimum formation stress in the sediment. The fracture plane is generally normal to the direction of minimum stress. When free gas flux through soft unconsolidated sediments is not too high, tensile fractures may be transient and spatially compact. It has been suggested that gas moves upwardly through unconsolidated muddy sediment as isolated disks, the diameters of which are much larger than their thicknesses. The plane of the disk may be vertical or sub-vertical, in the absence of tectonic stress. Upon reaching a pocket of trapped gas, these disks may give up their gas to the pocket and disappear. Whereas gas is known to migrate many kilometers upward to conventional hydrocarbon reservoirs, it is to be expected that such thin migrating disks of gas may form solid hydrate shortly after entering the gas hydrate stability zone. Indeed, in seafloor experiments in which mixtures of methane, seawater and sediment were vigorously mixed, hydrate formed within minutes. Therefore, hydrate deposits formed from isolated moving disks of gas are likely to be concentrated near the base of the gas hydrate stability zone.

By contrast, when the flux of free gas is substantial, gas conduits (e.g., fractures) may remain open and allow gas to move significant distances through the gas hydrate stability zone. Hydrate may form rapidly at fracture or fault surfaces, stiffening the channel and allowing gas to flow through it without contacting liquid water. This behavior was observed in experiments in which methane was injected into the bottom of a cylinder of alluvial mud, described in a paper by Brewer et al. ("Deep ocean field test of methane hydrate formation from a remotely operated vehicle," *Geology* 25, 407-410 (1997)). In these experiments, the channel, from which sediment was completely displaced by the flow of gas, gradually filled with solid hydrate. In addition, gas migration chimneys have been observed in the gas hydrate stability zone at Blake Ridge. Free gas may be isolated from liquid water by these hydrate-stiffened channels and may travel substantial distances through the gas hydrate stability zone, provided the channel (e.g., fault or fracture) continues.

In the earth, faults are likely to be planar, with strike parallel to the direction of maximum horizontal stress. According to Coulomb theory, the dip of faults or fractures is 45 degrees plus $\phi/2$, where $\phi$ is the friction angle of the marine sediment in the absence of hydrate and may be typically equal to about 20 degrees. Discontinuities with dip angles of about 50-60 degrees are commonly observed in shallow marine sediments, consistent with the above theory of formation. An accumulation of free gas can induce a fault in the sediment above it when the free gas pressure exceeds the strength of the overlying sediment. The dip and strike of hydrate-filled faults may be controlled by the friction angle and the direction of maximum horizontal stress in the sediment body, respectively. By symmetry, these hydrate dikes can exist in chevrons (V-shaped structures). In contrast, hydrate-filled tensile fractures may have a unique dip and strike controlled by the minimum stress and maximum horizontal stress directions. Such fractures may not form chevrons. Once a conduit fills with hydrate, it may become the strongest feature in the sediment and may be unlikely to be fractured or faulted again. Free gas may instead find another path having the same (or nearly the same) dip and strike as previous self-induced fractures or faults. Thus, a series of parallel hydrate-filled dikes may form in the gas hydrate stability zone above prolific gas sources in marine environments.

Figure 4:
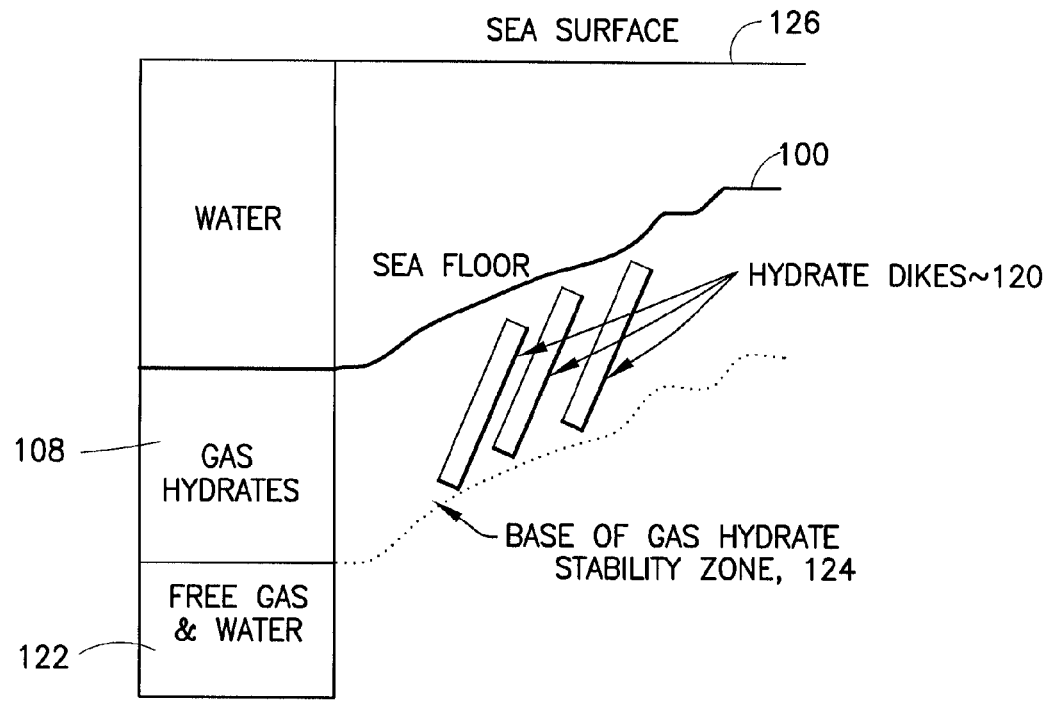
FIG. 4 is a diagram of an example of the structure of one type of marine gas hydrate deposit, in accordance with aspects of the invention.

Referring to FIG. 4, there is illustrated a diagram of an example of a series of parallel hydrate dikes 120 formed in the gas hydrate stability zone 108 below the sea surface 126. As explained above, a source of free gas may exist in a region 122 below the base 124 of the gas hydrate stability zone 108. Hydrate dike systems may in general cut across stratigraphic boundaries. However, an exception may occur when a fault or fracture intersects a layer of coarse sand beneath a permeability barrier. In this situation, the gas may spread horizontally to produce a hydrate horizon that coincides with local stratigraphy. In addition, chevrons of hydrate may open upward when fault dips are symmetrical about the axis of maximum horizontal stress. It should also be noted that very high fluxes of mass and energy may prevent formation of parallel hydrate dike systems. Rather, gas pathways may remain open through the gas hydrate stability zone, allowing gas to break through the seafloor and vent to the ocean. Thus, the most abundant, useful gas hydrate deposits may occur in regions where gas flux is neither too high nor too low, but high enough to carry gas well into the gas hydrate stability zone, forming dikes as discussed above.

Conventional marine seismic surveys use sources and streamers of hydrophones towed near the sea surface. This geometry may be optimal for detecting horizontal or near-horizontal acoustic anomalies and has been generally regarded as appropriate for finding hydrate because many hydrate-accumulation models are one-dimensional (i.e., reservoir properties such as hydrate saturation are functions of depth with no transverse variation). However, conventional marine seismic surveys have important limitations when used in the presence of steeply dipping hydrate dikes. Firstly, little or no energy may be reflected back to conventional receivers from the dikes, as discussed further below. Secondly, large lateral changes in velocity are not acknowledged by conventional seismic processing algorithms. Thirdly, depending on the lateral extent of the dikes compared to the seismic wavefront, and whether they form in chevrons, horizontal reflectors may be distorted and not easily interpreted in the seismic survey.

Bulk gas hydrate has a compressional sound speed of approximately 3800 meters per second (m/s), a shear sound speed of approximately 1950 n/s, and a density of approximately 920 kilograms per cubic meter ($kg/m^3$). By contrast, unconsolidated or lightly consolidated high porosity marine sediment has a compressional velocity of approximately 2000 m/s, and a water-saturated density of approximately 2000 $kg/m^3$. If the dikes are comprised of sediments cemented by hydrate, one may see as much as a doubling in the compressional and shear velocities, while the density remains nearly the same as for the surrounding water-saturated sediment. Thus, such dikes may present a large acoustic impedance contrast with water-saturated sediment, and may generate strong seismic reflections for appropriate ray path geometries (as discussed further below) which implies good detectability. On the other hand, a dike comprised of pure (or nearly pure) hydrate that has excluded sediment may present a strong velocity contrast (e.g., about 3800 m/s versus 2000 m/s) with neighboring water-saturated sediments, but not a large acoustic impedance contrast. This is because the density of pure hydrate may be approximately half that of water-saturated sediment, and thus compensates for the approximate doubling of sound speed in the hydrate as compared to the surrounding water-saturated sediments. As a result, seismic waves at normal incidence may not be strongly reflected, but waves at larger angles of incidence may be.

According to one embodiment of the invention, seismic techniques may be used to detect one or more gas hydrate dikes. To be able to resolve reflections from the front and the back of hydrate dikes, the wavelength λ of the source should be no more than four times the thickness of the dike. Or in other words, the thickness of the dike should be approximately equal to or greater than a quarter wavelength at the operating frequency of the seismic source. For simplicity, the following discussion will assume a dike thickness of 1 meter. However, it is to be appreciated that this example is for the purpose of explanation only and is not intended to be limiting. Dikes may have a variety of thicknesses that may or may not be close to 1 meter in diameter. For a velocity within the dike of approximately 4000 m/s, a source frequency of about 1 kHz means that the dike will have a thickness of about a quarter wavelength. In sub-seafloor sediments, attenuation of compressional waves varies between about 0.01 and 0.20 dB per meter per kilohertz (dB/m/kHz), and attenuation of shear waves varies between approximately 1 and 100 dB/m/kHz. Accordingly, the amplitude of a 1 kHz compressional wave propagating 200 meters would be reduced by approximately 2 dB to 40 dB. Such amplitude reflections are within the detection range of available equipment and indicate that detection of dikes of this size may be feasible. However, to ensure detection, it may be important to keep the propagation distance within the sediments to a minimum.

Marine seismic sources are conventionally detonated in the water and the emitted energy is converted to compressional and shear waves at the seabed. The transmitted compressional energy is defocused by the increase in the propagation velocity from about 1500 m/s in the water to about 2000 m/s in the seafloor sediments. Snell's law shows that only energy radiated in the water within a cone with top angle of 90 degrees can penetrate the seafloor as compressional energy. Snell's law further implies that the energy transmitted from the source at angles between 0 and 30 degrees to the vertical will be transmitted through the seafloor at angles between about 0 and 45 degrees to the vertical, whereas the energy emitted at the source at angles between about 30 and 45 degrees to the vertical will be spread through the sub-seafloor over the rest of the solid angle, from 45 degree to 90 degrees. There is a strong decline of wave energy in the sub-seafloor for propagation angles exceeding 45 degrees. Therefore, marine sources usually are not omni-directional, but instead may be designed to transmit most of their energy within the "cone of penetration," i.e., within the solid angle in which the energy can penetrate the seafloor. Energy transmitted outside of this cone may be undesirable because it may be trapped within the water column and may be a source of noise within the signal bandwidth. As a result, the useful energy transmitted from a marine source normally may be concentrated at angles of incidence considerably less than 45 degrees.

Figure 5:
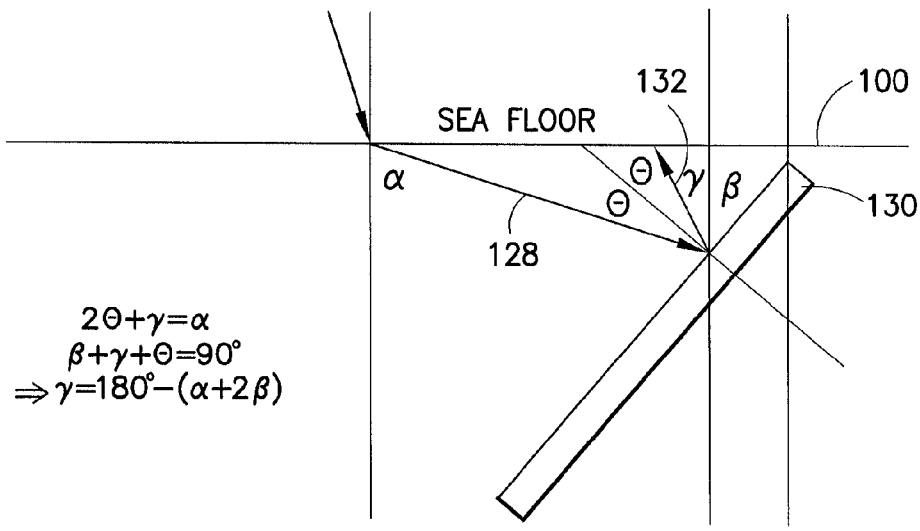
FIG. 5 is a diagram of an example of a reflection geometry for detecting a gas hydrate dike with sound waves, according to one embodiment of the invention.

Referring to FIG. 5, there is illustrated a diagram of an example of a reflection geometry for detecting a hydrate dike with sound waves, according to one embodiment of the invention. When a ray 130 (from a source) propagating at an angle α to the vertical reaches a plane 130 dipping at an angle β from the vertical, the reflected ray 132 will come back up at an angle γ=180°−(α+2β) to the vertical, as shown in FIG. 5. A value of γ less than 90° means that the ray 132 will be reflected back to the seafloor. Therefore, detection requires α>90°−2β. As discussed above, the dip of faults or fractures that may carry gas into the gas hydrate stability zone may typically be 45° plus ϕ/2, where ϕ is the friction angle of the marine sediment in the absence of hydrate and may be typically equal to about 20°. Thus, gas hydrate dikes may form with a dip (angle from horizontal) of approximately 55°, for which β=35°. At β=35°, γ+α=110°. As discussed above, in order to have significant energy impinge on the dike plane, the incident angle should be α<45°, implying γ>65°. However, the larger the value of γ, the farther away from the reflection point the ray 132 will emerge at the seafloor. Longer propagation distance through the sediment means less energy reaching the receiver, due to both absorption and wavefield spreading. As noted above, for reliable detection, propagation distance through the sediment ideally should be minimized. Readily detectable reflected waves may propagate at directions γ<45°. Thus, for conventional marine or sea floor seismic sources and receivers, desirable angles of incidence and reflection are mutually exclusive, making detection of hydrate dikes difficult or impossible.

For example, the Deep Towed Acoustic/Geophysics System (DTAGS) which has been used in hydrate exploration campaigns, generally is adapted to detect sound waves incident at the seafloor at angles less than about 30° from the vertical, although the geometry does allow for a wider angle acquisition aperture. The DTAGS is designed for near-subseafloor targets and makes seismic measurements at frequencies between 15 Hz and 650 Hz. However, with the dips of hydrate dikes expected to range from about 50° to about 90°, very little energy may be reflected back from the dikes to the surface to be recorded by the towed receivers, making detection unlikely.

Conventional ocean-bottom seismic surveys use sources towed at or near the sea surface and multi-component receivers placed on, or planted in, the seafloor. Although the ocean-bottom system allows the estimation of more acousto-elastic properties of seafloor sediments, the acquisition aperture of the system is not significantly increased over deep-towed systems. This means that the same limitations for recording reflections from steep reflectors apply to ocean-bottom seismic systems.

In addition to the problems associated with detecting individual hydrate dikes discussed above, further issues may arise when multiple dikes are present. For example, if the angular distribution of planar hydrate reflectors were random, scattering may destroy the coherency of the downgoing wavefront and, therefore, the coherency of reflections from stratigraphic boundaries both within and below the gas hydrate stability zone. This may occur when steeply dipping dikes and horizontal hydrate-saturated sands are both present in a reservoir.

Due to the difference in stiffness and density between sediments and hydrate dikes, a sequence of parallel dikes may create an azimuthal anisotropy which may be detected by analyzing Stoneley waves and shear waves refracted along the seafloor. One should expect these waves to have smaller effective velocities when propagating perpendicular to the dikes. Although the absence of shear and Stoneley azimuthal anisotropy may be a strong negative indicator for the existence of hydrate dikes, such anisotropy may be due to other causes. Furthermore, it is to be appreciated that due to the low-frequency nature, and therefore the low-resolution nature, of surface waves such as Stoneley and refracted shear, one may only see the collective effect and not the effect of individual dikes.

Figure 6:
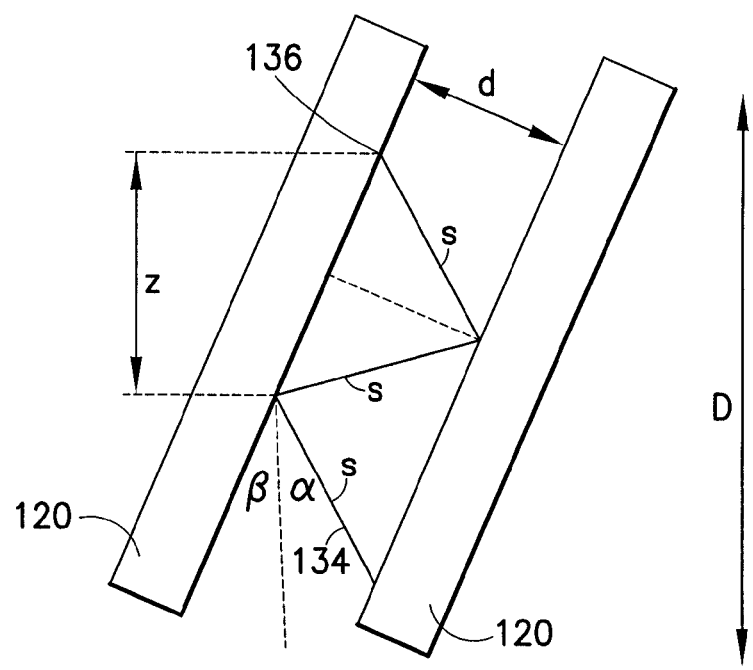
FIG. 6 is a diagram illustrating a waveguide effect caused by parallel hydrate dikes, in accordance with aspects of the invention.

In another example, a series of parallel dikes may act as waveguides. Referring to FIG. 6, there is illustrated a diagram of a geometry of a guided ray 134 propagating between parallel hydrate dikes 120. A wavefront, such as guided ray 134, passing through the gas hydrate stability zone may be reflected multiple times between the surfaces of neighboring dikes 120. Due to the reflections, the downgoing wavefront may emerge below the gas hydrate stability zone after traveling a distance greater than that traveled by unguided waves having the same angle of incidence.

To estimate the increase in travel distance for a guided wave, consider two parallel dikes 120 inclined at an angle β from the vertical, as shown in FIG. 6, and a seismic wavefront in the sediment incident at an angle α. When the guided ray 134 travels from the lower surface of the upper dike (point 136), reflects off the upper surface of the lower dike, and returns to the lower surface of the upper dike, it travels a distance 2s while progressing a vertical distance z, as shown in FIG. 6. The distance s may be calculated from equation 1 below and the distance z may be calculated from equation 2 below:

$$s = \frac{d}{\sin(\alpha + \beta)} \quad (1)$$

$$z = 2s \cdot \cos(\alpha + \beta) \cdot \cos\beta = 2d \frac{\cos\beta}{\tan(\alpha + \beta)} \quad (2)$$

The distance that the guide ray 134 travels over a vertical distance D, compared to the distance an unguided ray at the same incidence travels over the same vertical distance is given by:

$$\Delta = 2sN - \frac{D}{\cos\alpha} \quad (3)$$

where N is the number of times the guided ray is reflected from the upper boundary of the waveguide. N is given by:

$$N = \frac{D}{z} = \frac{D}{2s \cdot \cos(\alpha + \beta) \cdot \cos\beta} \quad (4)$$

Then, inserting for N into equation (3), the difference in travel distance for a guided ray is give by:

$$\Delta = D\left[\frac{1}{\cos(\alpha + \beta) \cdot \cos\beta} - \frac{1}{\cos\alpha}\right] \quad (5)$$

For a wave at normal incidence (α=0) and dikes dipping at 55° (β=35°), Δ/D is equal to about 0.49. Thus, the guided ray may travel about one and a half times as far as does an unguided ray, partially because the guided ray may be offset horizontally by the dikes 120.

In addition to increasing the travel distance, dikes acting as waveguides may also reduce the vertical velocity of sound waves propagating through them. While traversing the vertical distance D, the guided ray 134 travels a distance 2s (D/z). Therefore, if the unguided wave speed in the sediment is given by $V_u$, the vertical component of the guided wave velocity is given by:

$$\frac{V_{Gz}}{V_u} = \frac{z}{2s} = \cos(\alpha + \beta)\cos\beta \qquad (6)$$

For a wave at normal incidence ($\alpha=0$) and dikes dipping at 55° ($\beta=35°$), the vertical component of the guided wave velocity may be approximately 67% of the unguided wave speed. It should be noted that these results (differences in both distance and velocity) may be independent of the distance between the parallel hydrate dikes 120, provided that the lateral extent of the seismic wavefront is much larger than the dike spacing.

In addition, if the lateral extent of the seismic wavefront is smaller than the lateral extent of the dike array, the wavefront may remain coherent within and below the dikes and may give coherent reflections from stratigraphic boundaries. However, as the wavefront may have its propagation time and curvature altered by the presence of the dikes, the two-way transit time associated with deeper reflections may be increased, and reflections may be horizontally offset from their true positions. For a narrow range of propagation angles, the effect of the hydrate zone may be effectively a time delay, leading to a push-down of the images of deeper reflectors. If the array of dikes is smaller than the lateral extent of the seismic wavefront, guided wave reflections may interfere with unguided wave reflections, resulting in broken or distorted seismic sections.

Figure 7:
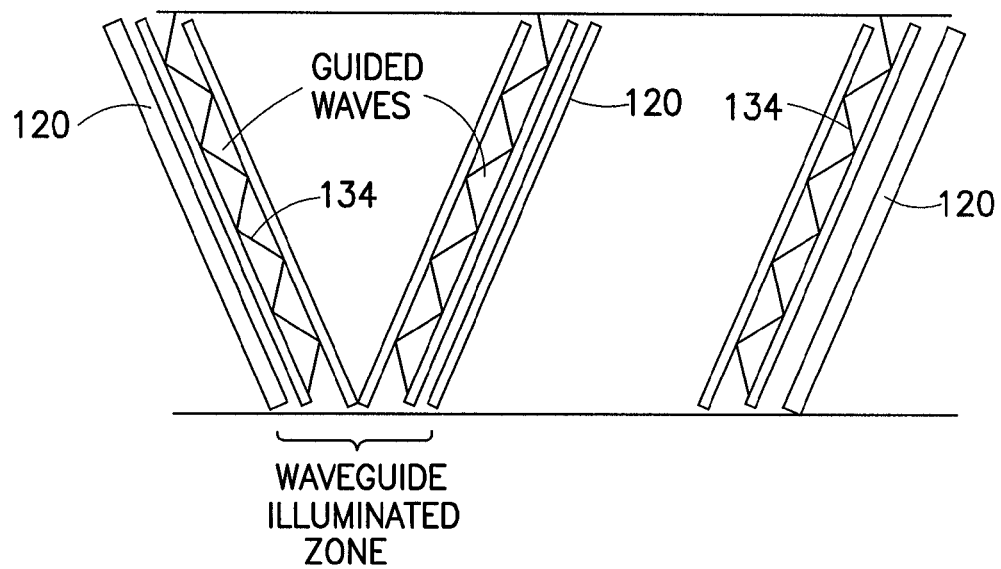
FIG. 7 is a diagram illustrating an example of a chevron of hydrate dikes acting as a waveguide to sound waves, in accordance with aspects of the invention.

As discussed above, the dip and strike of hydrate-filled faults may be controlled by the friction angle and the maximum horizontal stress direction in the sediment body, respectively. By symmetry, such hydrate-filled faults may form chevrons of dikes as shown in FIG. 7. Each group of parallel dikes may form a waveguide that channels energy to and from reflectors in and below the gas hydrate stability zone, as discussed above. The sediment body may be variably illuminated, resulting in horizontal offsets and amplitude and travel time variations across individual reflectors. It is possible that these effects contribute to the amplitude blanking that is sometimes observed to be coincident with the gas hydrate stability zone. In addition, although gas may accumulate at the roots of the dikes, these gas pockets may not necessarily generate bottom simulating reflectors in seismic records. On the other hand, a small amount of gas trapped under a widespread, but dilute hydrate deposit, such as that produced by in situ biogenic activity, may well give rise to a strong bottom simulating reflector. The presence of a bottom simulating reflector can therefore be a false positive, and its absence a false negative, for substantial hydrate accumulation.

Figure 8:
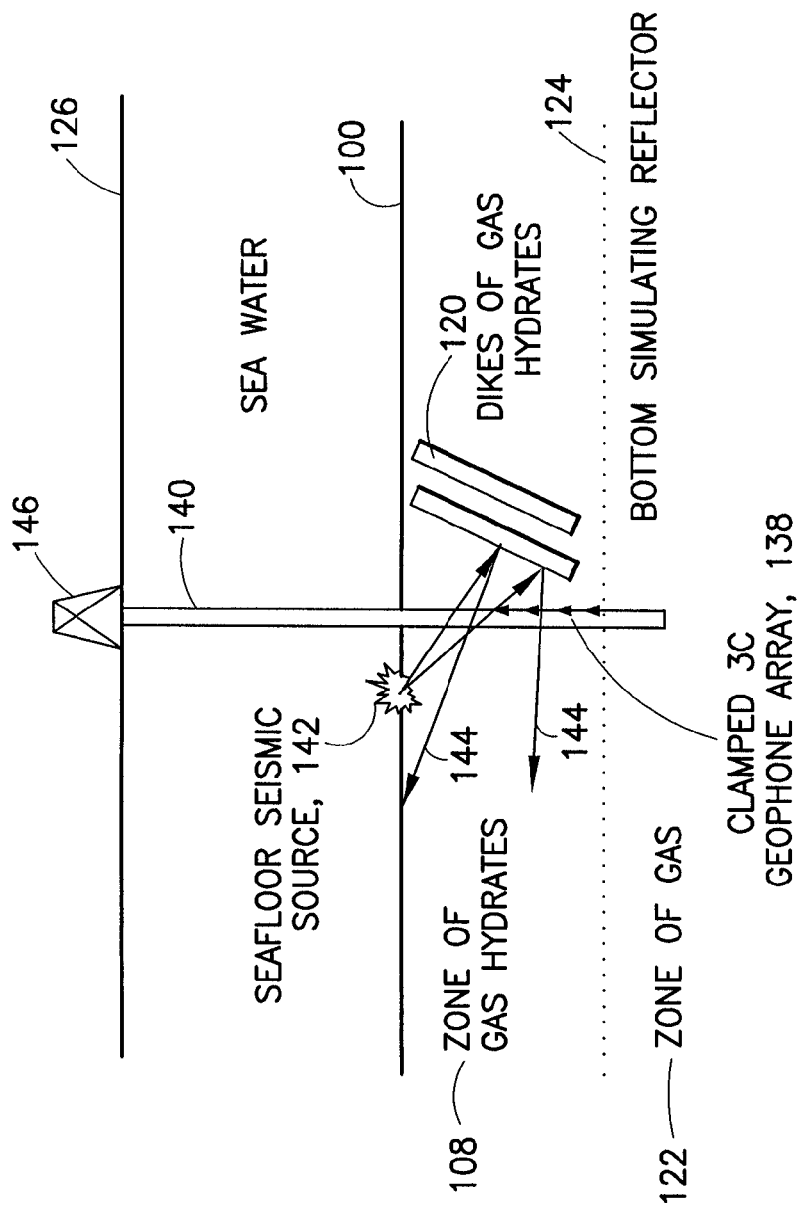
FIG. 8 is a diagram illustrating an acquisition geometry for imaging hydrate dikes according to an embodiment of the invention.

According to one embodiment, high contrast, steeply dipping hydrate dikes in soft marine sediments may be detected by looking at them "sideways," for example, by using acoustic reflection data collected in a vertical well. Such data may be collected using, for example, a walk-away vertical seismic profile (VSP) technique with one or more seafloor sources. Referring to FIG. 8, there is illustrated a diagram of one example of an embodiment in which receivers 138 may be deployed in a vertical well 140. One or more seismic sources 142 that may generate seismic waves may be located on the seafloor 100. In one example, the sources 142 should be located and configured such that wave energy reflected from the dikes 120 (e.g., rays 144) may impinge on the receivers 138, as shown in FIG. 8. One or more processors (not shown), and optionally a display (not shown), may be coupled to the receivers to process received signals and generate (and optionally display) seismic images. As the source is moved away from the borehole 140, the spot illuminated on the dike 120 may move down the slope of the dike. Therefore, it may be desirable to use several shots at different offsets from the wellhead 146 so as to define the dip and strike of the hydrate dikes 120. It should be noted that, in at least one embodiment, a seafloor source may be preferable because the ray path may be more constrained than from a surface source and may therefore have less effect from multipathing. In addition, a seafloor source may generate direct shear waves at the source. However, it is to be appreciated that the invention does not require the use of a seafloor source and many source options may be used.

One embodiment of the invention may include capability for high resolution imaging. In one example, an apparatus according to an embodiment of the invention may be capable of resolving features at approximately 0.5 to 1.0 m resolution. A conventionally processed VSP may have a bandwidth of approximately 10 to 50 Hz. With land vibrators, high-Q rocks and specialized processing, a bandwidth as high as 250 Hz may be achieved. It is generally assumed that one can resolve structures/features that are further apart from one another than one-quarter wavelength at the signal frequency. At a water-saturated sediment velocity of approximately 2000 m/s, the wavelength of a 100 Hz compressional wave is approximately 20 m, meaning that such a signal may be used to resolve structures/features about 5 m apart. Hydrate dike spacing may be smaller than this. Therefore, to achieve high resolution imaging capable of distinguishing individual dikes, a source capable of generating substantial energy at about 1 kHz may be preferable. A 1 kHz signal may be used to resolve structures/features about 0.5 m apart, assuming water-saturated sediment as above. In addition, it may be desirable to also resolve dike thickness. Assuming a dike thickness of about 1 m and a compressional wave speed of about 4000 m/s in hydrate, this may be achieved also using a 1 kHz signal from the source.

The most widely-used-marine seismic survey source is the airgun. However, at large water depths where gas hydrate may be found, it may not be feasible to deploy an airgun near the seafloor because of the high pressure that would be required to generate explosive expansion of trapped air when the ports of the airgun are opened. An example of a source that may be used in embodiments of the invention is described in U.S. patent application Ser. No. 11/127,014 to Sanders entitled "Seismic Imaging and Tomography Using Seabed Energy Sources," filed May 11, 2005, which is herein incorporated by reference. The Sanders source uses imploding glass spheres (i.e., a chamber of air at atmospheric pressure is allowed to collapse under the surrounding high-pressure water) and may be an efficient seismic source at any water depth. An airgun energy source may become increasingly less efficient as depth due to the decrease in differential pressure between the high-pressure air in the airgun chamber and the surrounding water pressure. By contrast, when a glass sphere that is internally at atmospheric pressure is deployed in the ocean, the differential pressure increases with depth. The ocean may provide a near-infinite pressure reservoir behind a deep-water glass sphere implosion. Consequently, the implosion may proceed faster than an airgun explosion, with the result that the energy output may be higher in frequency. The Sanders source may generate significant energy up to and beyond 1 kHz, making it an appropriate source for high resolution imaging, as discussed above.

Figure 9A:
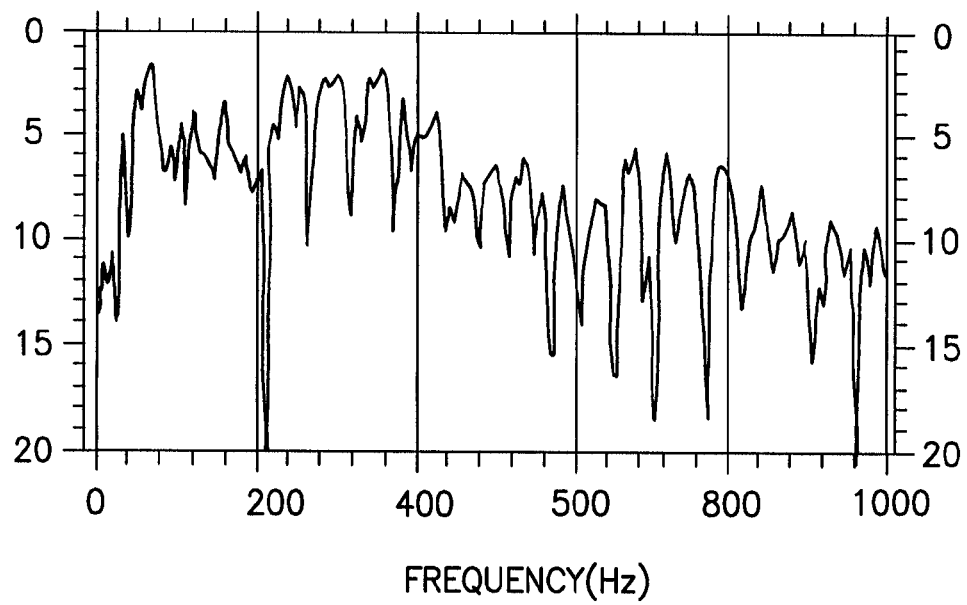
FIG. 9A is a frequency spectrum from one example of a source that may be used in an embodiment of the invention.
Figure 9B:
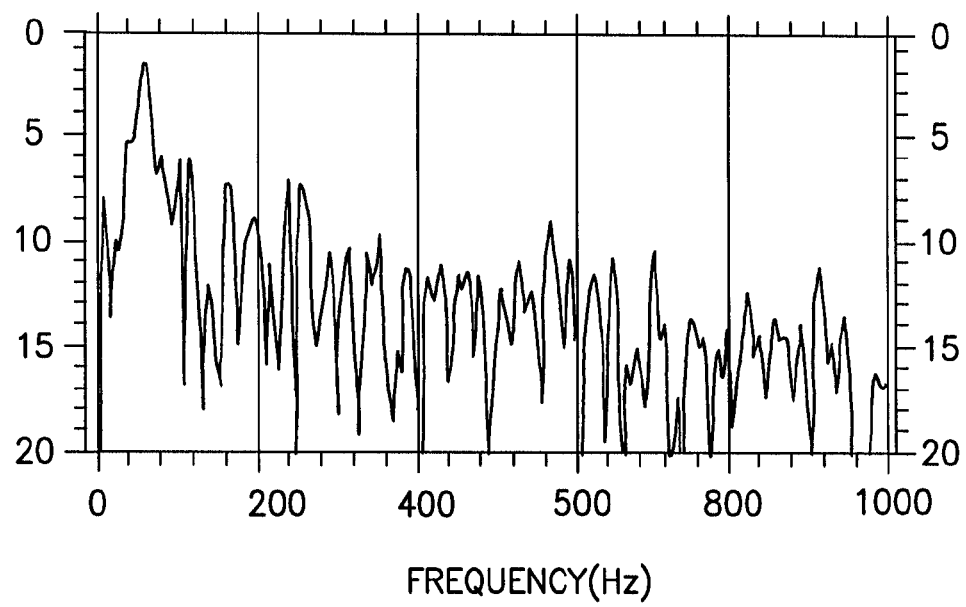
FIG. 9B is another frequency spectrum from the same source as in FIG. 9A.

Another source characteristic that may be important in some circumstances is the repeatability of the implosion signature of the source. Repeatability of a source is traditionally measured by the semblance spectrum for a series of repeated shots. The semblance spectrum measures the ratio of signal energy to total energy. Referring to FIGS. 9A and 9B, there are illustrated frequency spectra from an embodiment of the Sanders source. FIG. 9A illustrates the combined signal and noise frequency spectrum from 1.25 seconds (s) to 1.35 s, and FIG. 9B shows the background noise only from 4.25 s to 4.35 s. These spectra indicate that the Sanders source may have high values of semblance that may extend to frequencies as high as 1 kHz, again suggesting that this source may be an appropriate choice for embodiments of the invention.

As mentioned above, embodiments of the invention may use receivers that may be located in a vertical well drilled into the seafloor sediment body. One example of a suitable receiver may include the Schlumberger Versatile Seismic Imager (VSI)™. The VSI™ may comprise a variable number of three-component geophones that are deployed in the borehole and may be clamped to the borehole wall. However, it is to be appreciated that the invention is not limited to the use of the VSI™ receiver and other receives may be used. In order to record frequencies up to 1 kHz, 0.5 ms digital sampling may be used. Therefore, according to one embodiment, a standard VSI™ may be modified to allow it to digitally sample at 0.5 ms, or other, intervals, depending on the source frequency used. In addition, processing of the collected seismic data may employ an earth model that accounts for the possible presence of steeply dipping hydrate dikes, and results may be interpreted bearing in mind that this type of structure may be present.

In one embodiment, the VSI™, or another receiver, may be moved along the borehole to allow for spatial sampling. The receiver may be moved at intervals corresponding to a desired spatial sampling resolution. The number of times the receiver is moved may depend on the spacing between individual geophones. For example, if a receiver comprises geophones that are spaced 15 m apart, and 1 m spatial sampling is desired, then the receiver array may be moved in fourteen steps of 1 m each to cover the total aperture of the receiver array at an adequate spacing. At each step, the seismic source may be activated and waveforms recorded at each of the receiver geophones.

In addition or alternative to seismic techniques for detecting hydrate, aspects of the invention are directed to the use of electromagnetic sensing to locate and/or characterize hydrate deposits. As discussed above, gas hydrate is an insulator and may present a strong contrast to marine sediments that are typically saturated with salt water and may have a conductivity around 1 S/m. In addition, hydrate may accumulate near the seafloor, making it a good candidate for marine electromagnetic surveys.

Figure 10:
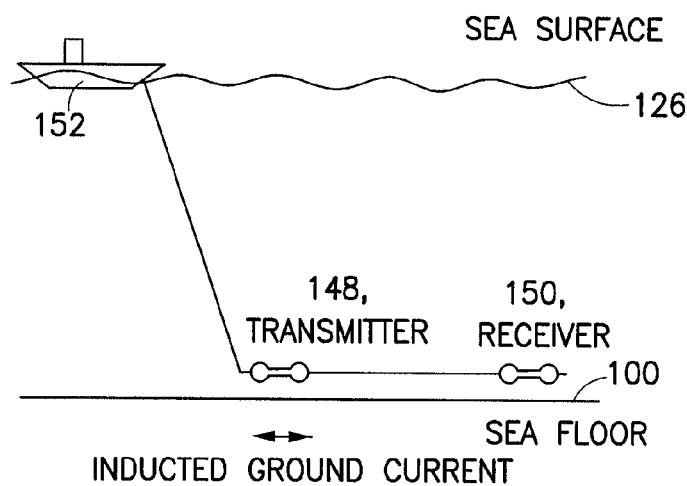
FIG. 10 is a diagram of a conventional marine electromagnetic survey method including a transmitter and one or more collinear receivers.

As discussed above, there has been some prior art work on marine electromagnetic surveys of regions previously identified as containing hydrate (e.g., from seismic or drilling programs). Some electromagnetic surveys of hydrate provinces have utilized horizontal electric dipole transmitters with one or more collinear ("in-line") horizontal electric dipole receivers, as shown in FIG. 10. A transmitter 148 and receiver 150 may be towed along the seafloor by a vessel 152. The transmitter 148 creates horizontal currents in the seawater and below the seafloor 100 parallel to its dipole. The secondary signal reaching the receiver 150, which is most sensitive to currents parallel to its dipole, depends on the electrical conductivity of its surroundings. Other surveys have used a dipole transmitter and multicomponent receivers. Measurement physics is similar to the in-line configuration, but non-collinear (e.g., broadside) dipoles are sensitive, in principle, to anisotropy of the conductivity below the seafloor. However, data processing for all prior hydrate surveys has assumed a horizontally stratified earth in which the electrical conductivity is isotropic within each horizontal layer. Such processing is not appropriate for detecting vertical or sub-vertical hydrate dikes. Although there has been some limited theoretical work on isolated vertical conductive bodies, applied to terrestrial prospecting for metallic minerals, such work is not directly relevant to detection and characterization of arrays of vertical and sub-vertical resistive dikes in a sub-marine environment.

The resistivity of marine sediment with no hydrate, $R_t(0)$, can be estimated from Archie's law:

$$R_t(0) = \frac{aR_w}{\phi^m} \quad (7)$$

where $R_w$ is the resistivity of the pore water, $\phi$ is the formation porosity, and a and m are empirically determined constants which may typically have the values a=1 and m=2. Pore waters of marine sediments may normally have low resistivities (i.e., are conductive), whereas hydrates are insulators. When the pore space is partially occupied by gas hydrate, the resistivity changes to:

$$R_t(S_h) = \frac{aR_w}{\phi^m(1-S_h)^n} \quad (8)$$

where hydrate saturation (volume fraction of pore space) is $S_h$, assuming the balance of the pore space is filled with water, and generally n=2. As discussed above, hydrate may sometimes form dikes, for example, in faults of fractures, in which all (or almost all) sediment is pushed out. In such circumstances, the hydrate dikes may be perfectly, or near-perfectly, insulating bodies. In addition, conductive channels may also be present if there are continuous paths of liquid water through a hydrate dike.

Referring again to FIG. 4, there is illustrated a schematic of an example hydrate reservoir including a series of parallel hydrate dikes 120. These hydrate dikes may present a substantial electrical contrast to ordinary marine sediments. If a dike is composed of solid hydrate (e.g., as may be the case with some hydrate-filled faults or fractures as discussed above), without a continuous liquid path to conduct electricity, it may represent a perfect (or near-perfect) barrier to the flow of low frequency electrical current. If the hydrate grows in the pore space of sediment, its saturation may be less than unity, and the resistivity of the dike may be given by equation (8) above. If hydrate displaces grains, but conduction paths remain continuous, the resistivity may likely have an intermediate value.

As discussed above, electromagnetic surveys in hydrate regions undertaken to date have been processed assuming a transversely isotropic earth. In order to detect steeply dipping dikes of hydrate, different methods that are sensitive to macroscopic conduction anisotropy below the seafloor may be used. In one embodiment, both acquisition and processing methods specifically designed to account for such sub-seafloor conductive anisotropy may be employed.

According to one embodiment, steeply dipping hydrate dikes in soft marine sediments may be detected by the following procedure. First, a region may be surveyed to determine whether its geologic characteristics make it a likely site for substantial hydrate accumulation. In one example, such a survey may include a step of determining whether a subsurface environment satisfies the temperature and pressure conditions for stability of gas hydrate. The survey may further include a step of determining that a prolific source of gas exists, from which abundant hydrate may be formed. This may be achieved by using a gas seep survey, as in known in the art, or by locating a large gas reservoir (e.g., using standard gas detection techniques known to those skilled in the art) under water depths that are appropriate for gas hydrate formation. In addition, in one example, a step of determining that a high flux of gas can be conveyed from deep sources of gas into the gas hydrate stability zone, may also be included. This may be achieved, for example, by direct seismic detection of gas chimneys, finding mud volcanoes or hydrate outcrops on the seafloor, or through local knowledge of fault zones. Optionally, another step of determining or estimating the regional stress tensor may be included. Regional stresses are mostly known and may be deduced from structures and tectonic movements. In addition, seafloor multi-component seismic data, or sonic tools may be used to measure formation stresses. Knowledge of the stress tensor may be used, for example, to estimate the orientation of hydrate dikes in the region, which may be used in setting up either seismic or electromagnetic detection equipment.

It is to be appreciated that the above-mentioned steps need not be performed in the order given above, and that the survey may employ different techniques than those described in this example. The purpose of a regional survey is to incorporate geologic and geomechanical features that may increase the probability of finding abundant, concentrated gas hydrate into a method of hydrate detection. Thus, the survey may employ a variety of steps and techniques to achieve this purpose. Once a region has been identified as a candidate for hydrate exploration, seismic or electromagnetic techniques may be used to detect and/or characterize hydrate deposits in the region. For example, a vertical seismic imaging process such as that described above may be implemented. Alternatively, or in addition, one or more electromagnetic methods, described further below, may be employed.

According to one embodiment, an electromagnetic transmitter and receiver combination system may be towed over an identified region of interest. In one example, the transmitter and receiver system may first be towed in a direction parallel to the direction of maximum horizontal stress. Once the survey in this direction is complete, the transmitter and receiver system may be towed perpendicular to the direction of maximum horizontal stress. A navigation system may be used to determine the location of the transmitter and receiver system during the surveys. The data collected from the surveys in each direction may then be compared and processed to detect evidence of macroscopic electrical anisotropy of the subsurface. Any processing of data may be based on an earth model that accounts for possible horizontal anisotropy; in particular, the possible presence of resistive dikes, unlike conventional processing that assumes a horizontal isotropic earth. It is to be appreciated that the order in which the parallel and perpendicular surveys are conducted is arbitrary and the invention is not limited to the case in which the parallel direction survey is completed first. In addition, it is to be appreciated that the overall survey may be conducted in a series of passes, and that the passes may be done in any convenient order. For example, the transmitter and receiver system may be towed for all passes in one direction (e.g., either the parallel or perpendicular direction) first, or may alternate between directions from one pass to another. Furthermore, it should be noted that a priori knowledge of the stress tensor may be helpful to estimate the direction of maximum horizontal stress.

Figure 11:
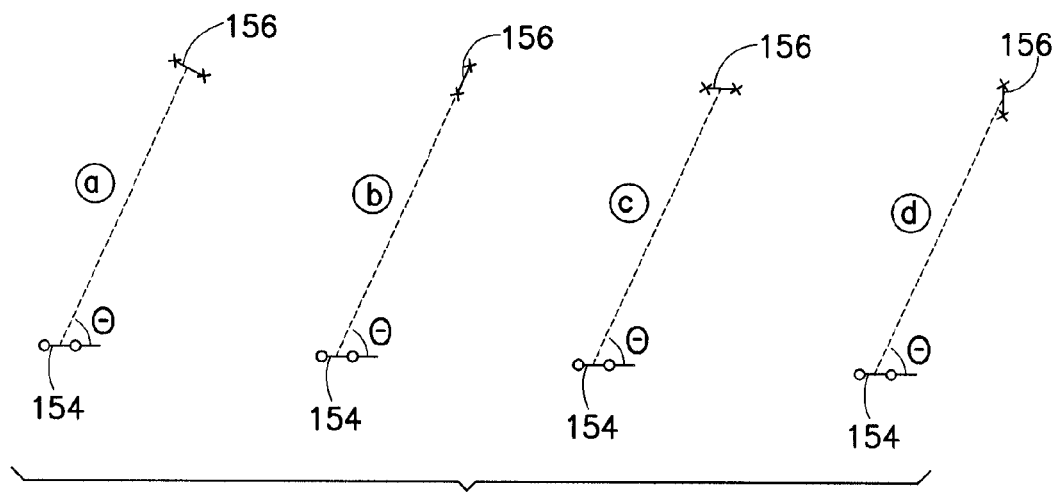
FIG. 11A is a diagram illustrating an example of an azimuthal relationship between a transmitter antenna and a receiver antenna according to an embodiment of the invention.
FIG. 11B is a diagram illustrating an example of a radial relationship between a transmitter antenna and a receiver antenna according to an embodiment of the invention.
FIG. 11C is a diagram illustrating an example of a parallel relationship between a transmitter antenna and a receiver antenna according to an embodiment of the invention.
FIG. 11D is a diagram illustrating an example of a perpendicular relationship between a transmitter antenna and a receiver antenna according to an embodiment of the invention.

In one embodiment, the above-described procedure may be implemented using, for example, a pair or array of in-line dipole-dipole transmitters and receivers. Various electromagnetic antennas can be useful for seafloor surveys in accordance with the principles of the invention, and the invention is not limited to any one type of antenna. Some examples of antennas that may be used include vertical electric dipoles (VED), horizontal electric dipoles (HED), vertical magnetic dipoles (VMD), and horizontal magnetic dipoles (HMD). Each of these antenna types, or combinations of them, may be used for either the transmitter and/or the receiver in a seafloor electromagnetic system. Furthermore, the orientation of the antennas with respect to one another can be varied. For example, the axes of transmitter and receiver HEDs need not be collinear, and moreover, need not be parallel. Referring to FIGS. 11A-D, there is illustrated several examples of antenna configurations that may be used according to embodiments of the invention. FIG. 11A illustrates an azimuthal relationship between a transmitter antenna 154 and a receiver antenna 156. FIG. 11B illustrates a radial configuration, FIG. 11C illustrates a parallel configuration, and FIG. 11D illustrates a perpendicular configuration. A transmitter and receiver pair sensitive to different polarizations of electric and/or magnetic fields may be particularly useful in sensing conductive anisotropy in the seafloor, as discussed further below.

According to another embodiment, an electromagnetic survey technique may be conducted that uses a combination of transmitters and receivers that are inherently sensitive to anisotropy. In one example, this technique may use only a single pass over a region of interest compared to the above-described example that uses two passes, one parallel and another perpendicular to the direction of maximum horizontal stress and compares the data from the two passes to detect subsurface anisotropy. There are many transmitter-receiver combinations that may be sensitive to conductive anisotropy. One example is the cross dipole-dipole array, in which the transmitter may be, for example, an HED and the receiver may be a pair of HEDs oriented at 90 degrees to one another. In one embodiment, the receiver pairs may be placed on the seafloor, and the dipole transmitter towed above them, for example, with the polarization of the transmitter antenna along the sailing direction. In one example, making two passes over the field in mutually perpendicular directions may give better constraints on estimates of sub-seafloor anisotropy.

Electromagnetic properties may be measured in either the frequency domain or the time domain. In the first case, phase shift and attenuation may be measured at one frequency or as a function of frequency. In the second case, the time delay between the launching of a pulse or step and its reception may be measured, together with the attenuation. In principle, these approaches are connected mathematically by the Fourier transform, but in practice it may be that one or the other proves superior. The multipath effects inherent in parallel propagation through seawater and the seafloor suggest that time-domain information often may be easier to interpret, and several prior art theoretical publications concerning seafloor electromagnetic surveys prefer the time-domain approach. However, the frequency domain technique has also been used, for example, in commercial low frequency controlled source electromagnetics (CSEM) used to determine the conductivity of hydrocarbon-bearing formations in deep marine environments. Seafloor CSEM implementations have used sources typically operating at or below 1 Hz and map formation conductivity down to several kilometers below the seafloor by inverting the electromagnetic diffusion equation. For depths of investigation relevant to gas hydrate, CSEM techniques may be used, but may employ a source operating at substantially higher frequencies. Hybrid techniques, using both time-domain and frequency-domain processing, such as wavelet analysis, may also be useful to capture more information available in a received electromagnetic signal.

In addition to using antennas having varying polarizations, in one embodiment the distance between the transmitter and receiver may also be variable, and spatially distributed arrays of transmitters and/or receivers may be used. Such arrays of transmitters and/or receivers may be static, or one or more of the antennas may be movable to survey an area larger than the extent of the arrays.

According to one embodiment, electromagnetic (EM) transmitter-receiver systems may be adapted to use low frequency signals, having relatively long wavelengths. It may be noted that EM transmitter-receiver combinations that may not have been found useful in terrestrial surveys may nonetheless be useful in submarine applications. This is because low frequency EM signals propagate fastest through air, slower through soil and marine sediments, and slowest through seawater. In terrestrial surveys, the air signal is the first to arrive, to be followed later by weaker signals that have propagated through the ground. Thus, signals of greatest interest to land-based exploration geophysics may be relatively difficult to extract. At the seafloor, however, the situation is reversed, with the desirable signals that propagate through the sediment arriving sooner than do signals propagating through the seawater. Accordingly, in at least some embodiments, it may be preferable to use low frequency EM signals to map subseafloor features.

In one example, the source frequency may be at least partially governed by the electromagnetic skin depth of the sediment. Skin depth is given by the equation:

$$\delta = \sqrt{\frac{1}{\pi f \sigma \mu}} \quad (9)$$

where $\delta$ is the skin depth, f is the frequency, $\sigma$ is the seafloor conductivity, which may have a typical value of about 1 S/m, and $\mu$ is the electrical permeability of the sediment, which may typically have a value of approximately $4\pi \times 10^{-7}$ H/m. In general, it may be preferable to limit the spacing d between the transmitter and receiver to no more than about five skin depths (d<5$\delta$). In addition, in some embodiments, the depth of investigation into the sediment may depend on the spacing between the transmitter and the receiver. A general rule of thumb holds that the depth of investigation may be approximately one half of the spacing between the transmitter and the receiver. These parameters may be used to select both transmitter-receiver spacing and operating frequency.

As discussed above, the upper end of hydrate dikes may terminate a distance below the seafloor that is governed by the extent of hydrate-bearing faults or fractures and by near-seafloor geochemistry. The bottom end of the dikes may be no deeper than the depth of the base of the gas hydrate stability zone, typically less than about 1 km below the seafloor. This knowledge may therefore guide set-up of the transmitter-receiver spacing. Also, using the condition d<5$\delta$ for the skin depth in equation (9), an estimate of the useful frequency may be given by:

$$f < \frac{25}{\pi d^2 \sigma \mu} \quad (10)$$

Assuming, for example, a desired transmitter-receiver spacing of about 100 m, equation (10) suggests an operating frequency of about 633 Hz. However, it is to be appreciated that the allowable number of skin depths between transmitter and receiver may depend on many factors, including, for example, the strength of the transmitter, the sensitivity of the receiver, the geometry of the array with respect to the seafloor, the distance of the array above the seafloor, etc. Therefore, the above calculation is only illustrative of some principle governing frequency choice and is not intended to be limiting.

According to another embodiment, the spacing between the transmitter and the receiver and/or the number of antenna elements present in each of the transmitter and receiver, may also be selected based at least in part on the type of detection desired. For example, if the antenna array is small compared to the dike spacing, it may be possible to image individual dikes. If the antenna array is large compared to the dike spacing, the array may sense electrical anisotropy, but may not image individual dikes. Both scenarios may be useful, and in one embodiment, both may be achieved with a single antenna array having varying element spacing. As noted above, many configurations of antenna spacing and polarizations may be useful and can be used in different embodiments to detect subseafloor electrical anisotropy in different ways. One feature that may be common to all embodiments and may have particular importance for detecting vertical or subvertical hydrate dikes is that, unlike conventional systems, horizontal (transverse) isotropic conductivity and stratigraphy are not assumed for data processing.

Figure 12:
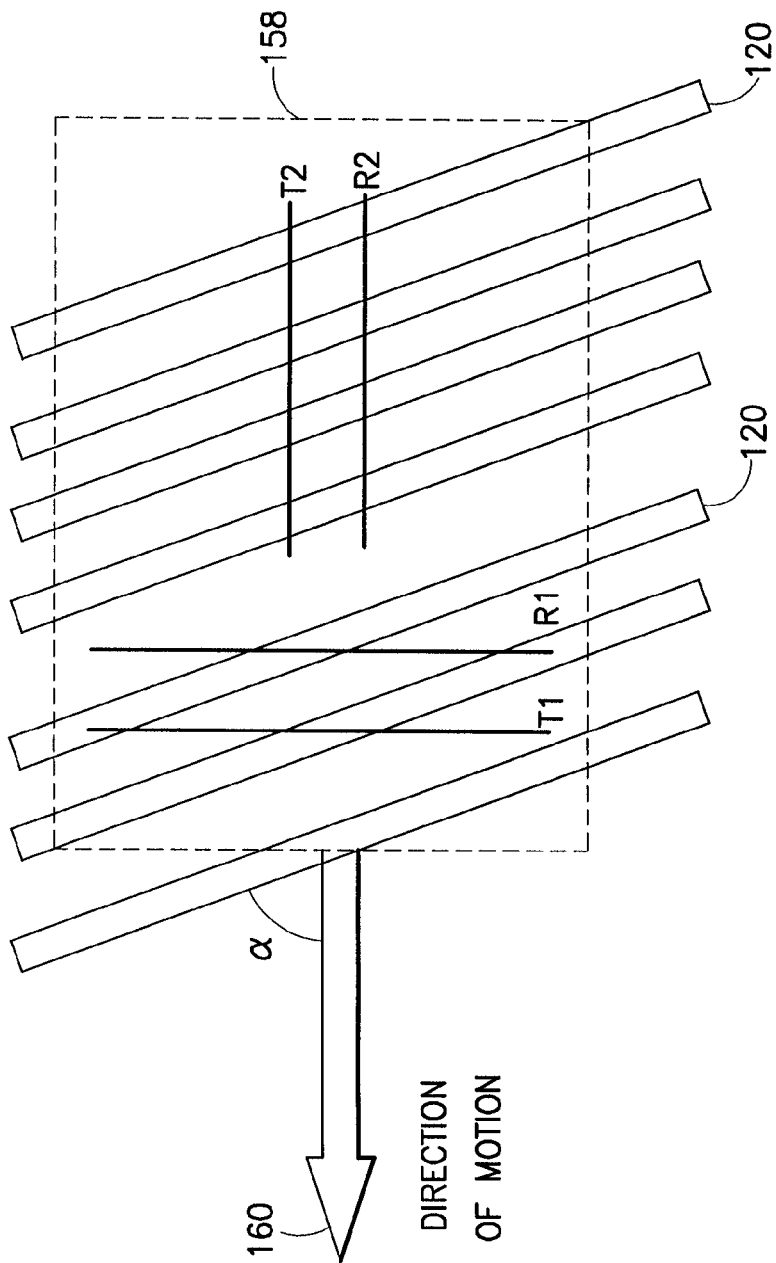
FIG. 12 is a diagram of one example of an electromagnetic survey system according to another embodiment of the invention.

Referring to FIG. 12, there is illustrated one example of a transmitter-receiver configuration that may be used to detect a series of parallel, dipping hydrate dikes. In this example, as assumption may be made that the spacing between dikes 120 may be small relative to the length of HED antennas that may be used to sense them. In this case, the electric field E acting on a medium with conductivity $\sigma$ will generate an electric current:

$$J = \sigma E \quad (11)$$

The current near an insulating dike tends to be parallel to the dike surface, and the magnitude of the current is proportional to the projection of the electric field on this surface. This current generates a secondary field that retains information about the conductivity anisotropy. This secondary field may be detected by the receivers.

An example of an implementation of this concept is shown in top view, looking down on the seafloor, in FIG. 12. It should be noted that the hydrate dikes 120 may not intersect the seafloor, but are illustrated here for the purposes of explanation and clarity. An array of HED antennas is schematically shown inside the dashed box 158. According to one embodiment, transmitters T1 and T2 may be activated alternately, and receivers R1 and R2 may receive signals from both transmitters. The resulting four data sets are denoted T1R1, T1R2, T2R1 and T2R2. The transverse electric (TE) pair T1 and R1 may have a common axis perpendicular to the direction of motion 160. The transverse magnetic (TM) pair T2 and R2 may have a common axis parallel to the direction of motion 160. The T1R2 and T2R1 combinations are cross dipole (TX1 and TX2, respectively) pairs. As shown in FIG. 12, the direction of motion may make an angle α to the strike of the dikes 120.

In one embodiment, a line or set of lines may be collected with the TE polarization, and another line or set of line may be collected with the TM polarization. The magnitude and direction of the conductive anisotropy may be determined by plotting the TE response versus the TM response. If the anisotropy is substantial, the direction α of predominant conductivity may be found from the equation:

$$\tan\alpha = \sqrt{\frac{TE}{TM}} \quad (12)$$

In another embodiment, a grid may be surveyed (i.e., several lines of data may be collected from all four transmitter-receiver pairs), and the resulting data may be inverted for the subsurface scattering potential from four images, namely one TE image, one TM image and two TX images.

In summary, exploration paradigms for gas hydrate have been described that are at least partially based on a particular hydrate accumulation model. Specifically, gas hydrate may form in vertical or sub-vertical dikes whose strike is parallel to the direction of maximum horizontal stress and whose dip is controlled by either the friction angle, in the absence of hydrate, or by the reservoir minimum horizontal stress direction. Multiple dikes may be parallel or may form in chevrons, but may not be equally spaced. Parallel dikes, even when unevenly spaced, may functions as waveguides, as discussed above, that can distort conventional seismic survey results. In addition, conventional EM surveys assume isotropic horizontal conductivity in the seafloor for data processing which may make it difficult or impossible to properly interpret EM signal in the presence of such dike formations. Embodiments of the invention are directed to seismic and/or electromagnetic survey techniques that are capable of detecting gas hydrate dikes and also may take into account geologic and geomechanical reasoning so as to improve the probability of finding commercially useful hydrate deposits. One example includes a seafloor walk-away vertical seismic profile method capable of imaging the dikes, as discussed above. Another example includes a seafloor EM survey technique adapted to detect subsurface horizontal anisotropy, as described above. These techniques may be use separately or in combination to detect and/or quantify marine gas hydrate accumulations.

Having thus described several aspects and embodiments of the invention, modifications and/or improvements may be apparent to those skilled in the art and are intended to be part of this disclosure. It is to be appreciated that the invention is not limited to the specific examples described herein and that the principles of the invention may be used in a wide variety of applications. The above description is therefore by way of example only, and includes any modifications and improvements that may be apparent to one of skill in the art.

The scope of the invention should be determined from proper construction of the appended claims and their equivalents.

What is claimed is:

1. A method of detecting gas hydrate, the method comprising:
   collecting electromagnetic surveying data about a region using an electromagnetic surveying technique; and
   characterizing at least one hydrate dike formation based at least in part on the electromagnetic surveying data, wherein characterizing the at least one hydrate dike formation includes estimating at least one of a dip and strike of a hydrate dike using the electromagnetic surveying data.

2. The method as claimed in claim 1, wherein collecting the electromagnetic surveying data includes performing an electromagnetic survey of the region using a transmitter and receiver system adapted to detect macroscopic subseafloor electrical anisotropy.

3. The method as claimed in claim 2, wherein performing the electromagnetic survey includes site includes performing the electromagnetic survey of the region using a transmitter and receiver system including a cross dipole-dipole array of antennas.

4. The method as claimed in claim 1, wherein collecting the electromagnetic surveying data includes
   estimating a direction of maximum horizontal stress in the region;
   towing a transmitter-receiver system over the site in a first direction parallel to the direction of maximum horizontal stress to collect first electromagnetic surveying data;
   towing the transmitter-receiver system over the site in a second direction perpendicular to the first direction to collect second electromagnetic surveying data; and
   comparing the first and second electromagnetic surveying data to detect evidence of macroscopic electrical anisotropy in the subsurface.

5. The method as claimed in claim 1, further comprising:
   collecting geologic information about the region; and
   determining a likelihood of significant hydrate presence in the region based at least in part on the geologic information.

6. The method as claimed in claim 5, wherein collecting the geologic information comprises identifying a location of a gas hydrate stability zone.

7. The method as claimed in claim 6, wherein collecting the geologic information further comprises determining a presence of a substantial source of gas below the gas hydrate stability zone.

8. The method as claimed in claim 6, wherein collecting the geologic information further comprises determining a presence of at least one of a fault or fracture extending into the gas hydrate stability zone from below the gas hydrate stability zone.

9. An exploration method for detecting marine gas hydrate comprising:
   selecting an exploration site based on a geologic indication of a probable presence of hydrate dikes;
   surveying the exploration site using an electromagnetic survey technique to collect electromagnetic surveying data about the exploration site; and
   processing the electromagnetic surveying data based on an earth model that accounts (i) for the probable presence of hydrate dikes and (ii) for possible horizontal anisotropy.

10. The exploration method as claimed in claim 9, wherein surveying the exploration site includes performing an electromagnetic survey of the exploration site using a transmitter and receiver system adapted to detect macroscopic subseafloor electrical anisotropy.

11. The exploration method as claimed in claim 10, wherein surveying the exploration site includes performing the electromagnetic survey of the exploration site using a transmitter and receiver system including a cross dipole-dipole array of antennas.

12. The exploration method as claimed in claim 10, wherein surveying the exploration site includes performing the electromagnetic survey of the exploration site using a transmitter and receiver system comprising an array of horizontal electric dipole antennas, including at least two transmitter antennas and at least two receiver antennas; and wherein the antennas are arranged so as to provide at least four transmitter-receiver pairs, including a transverse electric pair and a transverse magnetic pair.

* * * * *